US012539521B2

(12) United States Patent
Lee et al.

(10) Patent No.: US 12,539,521 B2
(45) Date of Patent: Feb. 3, 2026

(54) LINEAR DIVERTER FOR HAND SHOWER

(71) Applicant: Delta Faucet Company, Indianapolis, IN (US)

(72) Inventors: David Lee, Westfield, IN (US); Xinsheng Li, Dingxi (CN); Junxi Lu, Guangzhou (CN); Xiongbo Fu, Guangzhou (CN)

(73) Assignee: Delta Faucet Company, Indianapolis, IN (US)

( * ) Notice: Subject to any disclaimer, the term of this patent is extended or adjusted under 35 U.S.C. 154(b) by 966 days.

(21) Appl. No.: 17/681,018

(22) Filed: Feb. 25, 2022

(65) Prior Publication Data

US 2023/0271200 A1 Aug. 31, 2023

(51) Int. Cl.

*B05B 1/16* (2006.01)
*B05B 1/18* (2006.01)
*B05B 12/02* (2006.01)

(52) U.S. Cl.

CPC .............. *B05B 1/1636* (2013.01); *B05B 1/18* (2013.01); *B05B 12/02* (2013.01)

(58) Field of Classification Search

CPC .......... B05B 1/1636; B05B 1/18; B05B 12/02
USPC ....... 239/443, 446, 447, 556, 558, 560, 561, 239/562, 563
See application file for complete search history.

(56) References Cited

U.S. PATENT DOCUMENTS

| | | | | | |
|---|---|---|---|---|---|
| 5,690,282 | A * | 11/1997 | Guo | B05B 1/1636 239/446 |
| 9,427,749 | B2 | 8/2016 | Zhou et al. | |
| 9,829,116 | B2 | 11/2017 | Xu et al. | |
| 9,849,471 | B2 | 12/2017 | Lin et al. | |
| 9,901,939 | B2 | 2/2018 | Lin et al. | |
| 9,939,071 | B2 | 4/2018 | Lin et al. | |
| 10,046,340 | B2 | 8/2018 | Lin et al. | |
| 10,058,878 | B2 | 8/2018 | Hu et al. | |
| 10,060,105 | B2 | 8/2018 | Lin et al. | |
| 10,322,420 | B2 | 6/2019 | Lin et al. | |
| 10,427,174 | B2 | 10/2019 | Gong et al. | |
| 10,464,077 | B2 | 11/2019 | Lin et al. | |
| 10,722,906 | B2 | 7/2020 | Huang et al. | |
| 2021/0121897 | A1* | 4/2021 | Lin | B05B 1/3426 |

FOREIGN PATENT DOCUMENTS

| | | |
|---|---|---|
| CN | 204746652 U | 11/2015 |
| CN | 104941824 B | 6/2017 |

* cited by examiner

*Primary Examiner* — Christopher S Kim
(74) *Attorney, Agent, or Firm* — Bose McKinney & Evans LLP

(57) ABSTRACT

A showerhead including a handle supporting a water passageway and a sprayface, and a water diverter device. The water diverter device includes a pivotable waterway including a diverter body having an inlet and an outlet. The diverter body is pivotable such that the outlet is movable along an arcuate path. A driving mechanism is operably coupled to the water diverter device and includes a user interface, wherein axial movement of the user interface causes pivoting movement of the diverter body.

21 Claims, 19 Drawing Sheets

LINEAR DIVERTER FOR HAND SHOWER

BACKGROUND AND SUMMARY OF THE INVENTION

The present invention relates generally to a showerhead and, more particularly, to a showerhead including a linear diverter.

An illustrative embodiment showerhead of the present disclosure provides for linear actuation of a diverter which maintains ergonomics as the diverter can be operated with one hand. An illustrative embodiment showerhead of the present disclosure aligns spray settings in order of apparent spray force. The settings are not defined by flow rate, but instead by the number of outlets and the size of those outlets. These two features, alone or in combination, provides more intuitive use by resembling common relative amplitude based adjustments such as volume sliders.

In an illustrative embodiment showerhead, a diverter is operated using a pivoting waterway with a compliant seal to open/close selective passageways arranged in an arcuate path and defining a plurality of spray functions. An actuator, such as a hand lever or slide button, is along a longitudinal axis of an input waterway and a handle of the showerhead. The lever can slide axially along the handle of the showerhead. A connecting rod extends between the lever and the pivoting waterway such that axial movement of the lever is translated into rotational movement of the pivoting waterway. An association of spray outlets to function settings is illustratively created wherein there may be a change of apparent spray force as the settings change. An association of function settings to passageway inlets or connecting ports may be organized circumferentially such that rotation of the pivoting waterway from a first to a last setting may increase or decrease apparent spray force.

According to an illustrative embodiment of the present disclosure, a showerhead includes a handle extending along a longitudinal axis, a water passageway received within the handle, and a sprayface supported by the handle and including a plurality of spray outlets. A directing plate includes a plurality of connecting ports, the connecting ports spaced apart in an arcuate path, each of the connecting ports providing fluid communication between the water passageway and an associated arrangement of spray outlets. A water diverter device includes a pivotable waterway having a diverter body with a proximal end and a distal end, an inlet adjacent the proximal end, and an outlet positioned distally of the inlet. The diverter body of the water diverter device is pivotable such that the outlet is moveable along the arcuate path, and the outlet is in selective communication with different ones of the connecting ports of the directing plate.

According to another illustrative embodiment of the present disclosure, a showerhead includes a handle extending along a longitudinal axis, a water passageway received within the handle, and a sprayface supported by the handle and including a plurality of spray outlets. A water diverter device includes a pivotable waterway having a diverter body with a proximal end and a distal end, an inlet adjacent to the proximal end, and an outlet positioned distally of the inlet. The diverter body of the water diverter device is pivotable such that the outlet is moveable along an arcuate path. A driving mechanism is operably coupled to the water diverter device adjacent to distal end of the diverter body, wherein the driving mechanism includes a user interface slidably supported for axial movement parallel to the longitudinal axis of the handle, a connector coupling the user interface to the distal end of the diverter body, and wherein axial movement of the user interface is translated into pivoting movement of the diverter body.

According to a further illustrative embodiment of the present disclosure, a showerhead includes a handle extending along a longitudinal axis, a water passageway received within the handle, and a sprayface supported by the handle and having a plurality of associated arrangements of spray outlets. A water diverter device is in fluid communication with the water passageway. A driving mechanism is operably coupled to the water diverter device. The driving mechanism includes a user interface slidably supported for axial movement parallel to the longitudinal axis of the handle, and a connector coupling the user interface to the water diverter device, wherein axial movement of the user interface moves the water diverter device to provide fluid communication between the water passageway and different ones of the plurality of associated arrangements of spray outlets.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description of exemplary embodiments when taken in conjunction with the accompanying drawings, wherein.

Figure 1:
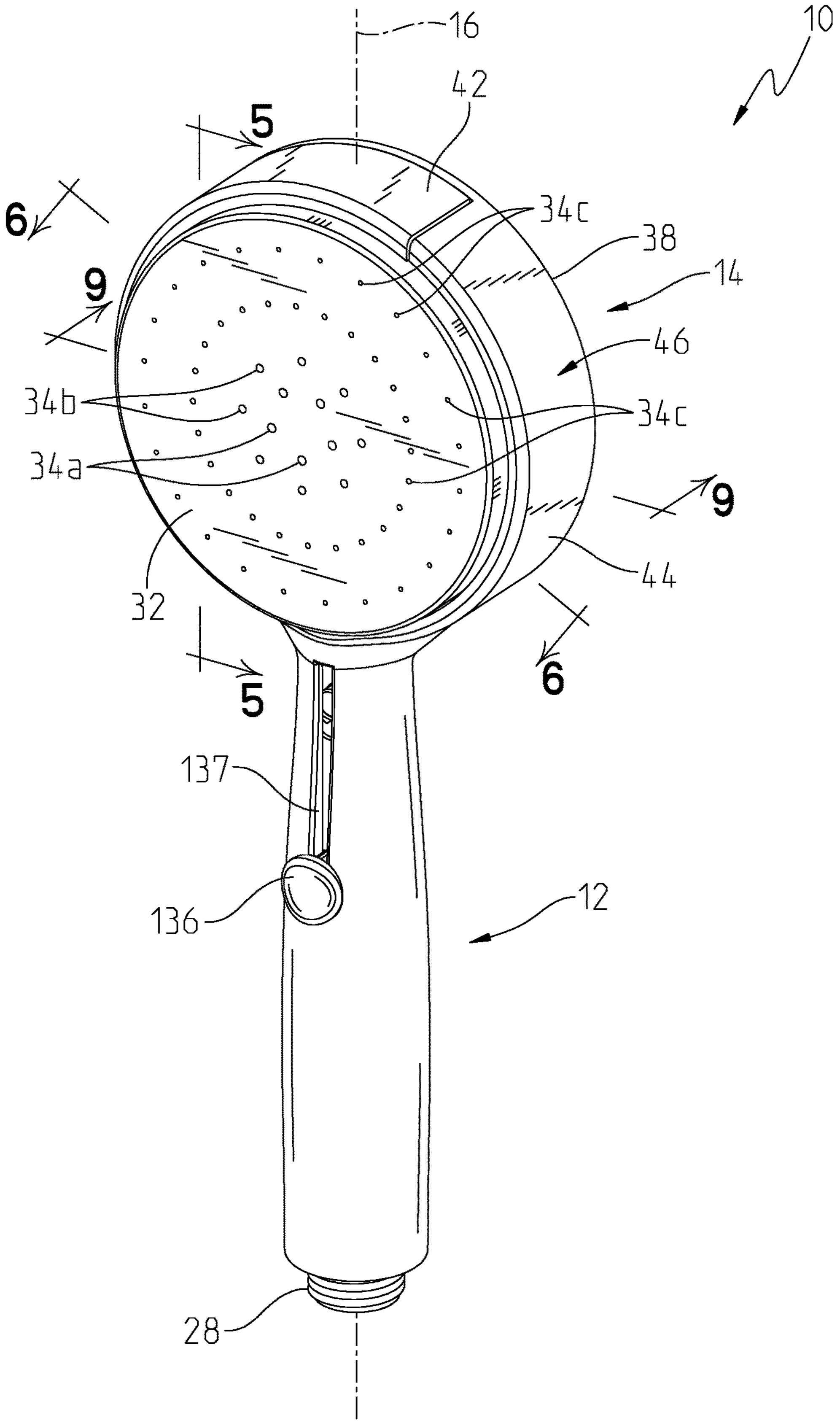
FIG. 1 is a front perspective view of an illustrative showerhead of the present disclosure.
Figure 2:
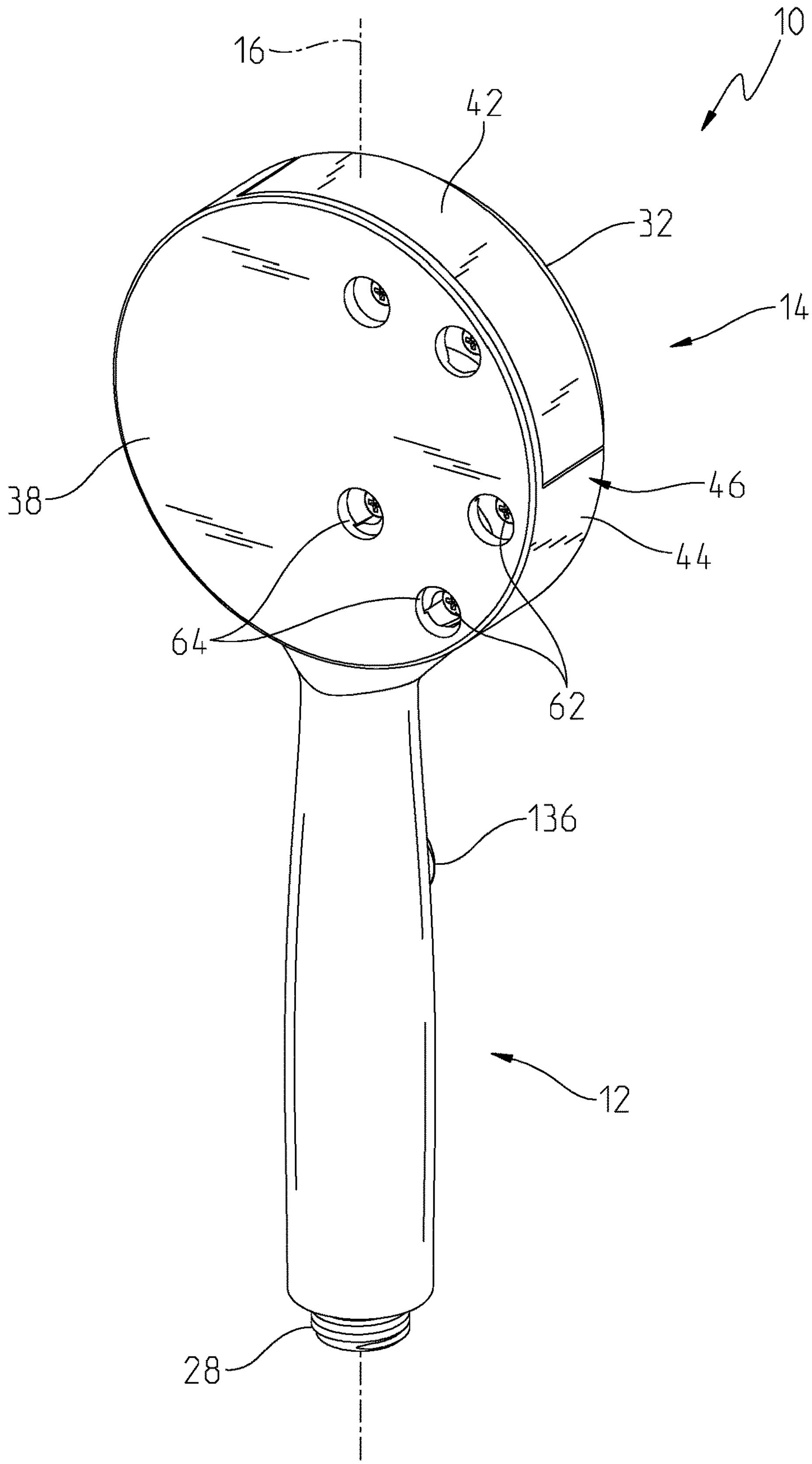
FIG. 2 is a rear perspective view of the showerhead of FIG. 1.

Corresponding reference characters indicate corresponding parts throughout the several views. Although the drawings represent exemplary embodiments of the various features and components according to the present disclosure, the drawings are not necessarily to scale and certain features may be exaggerated in order to better illustrate exemplary embodiments of the invention, and such exemplifications are not to be construed as limiting the scope of the invention in any manner.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Referring initially to FIGS. 1-4, an illustrative showerhead 10 of the present disclosure includes a handle 12 supporting a sprayhead 14. The handle 12 extends along a longitudinal axis 16 and receives a water passageway or conduit 18. The water passageway 18 includes an inlet 20 and an outlet 22. A first or base portion 24 of the water passageway 18 supports the inlet 20 and extends parallel to the longitudinal axis 16. A second or arm portion 26 extends an angle to the base portion 24 and supports the outlet 22. A conventional fluid coupler 28 is secured to the inlet 20 and is sealed to the base portion 24 of the passageway 18 by an o-ring 30. The fluid coupler 28 is configured to fluidly couple with a conventional fitting of a flexible hose (not shown).

The illustrative sprayhead 14 includes a sprayface 32 having a plurality of spray outlets 34*a*, 34*b* and 34*c* configured to discharge water generally parallel to a center sprayhead axis 36 extending perpendicular to the sprayface 32. The illustrative embodiment showerhead 10, the sprayface 32 extends generally parallel to the handle 12, such that the sprayhead axis 36 extends generally perpendicular to the longitudinal axis 16.

As further detailed herein, a plurality of different sets of spray outlets 34*a*, 34*b* and 34*c* are arranged in the sprayface 32. Illustratively, a first set of spray outlets 34*a* are circumferentially spaced in an annular arrangement proximate a center of the sprayface 32, a second set of spray outlets 34*b* are circumferentially spaced in an annular arrangement radially outwardly from the first set of spray outlets 34*a*, and a third set of spray outlets 34*c* are circumferentially spaced in two annular arrangements radially outwardly from the second set of spray outlets 34*b*.

The sprayface 32 is illustratively coupled to a rear housing or shell 38 that may be integrally formed with the handle 12. The sprayface 32 and the rear housing 38 (including the handle 12) may be formed of a polymer. Conventional means, such as fasteners, adhesives or ultrasonic welding, may secure the sprayface 20 to the rear housing 38. Illustratively, the sprayhead 14 includes a cylindrical sidewall 40 extending rearwardly from the sprayface 20 and including an arcuate extension 42. The arcuate extension 42 cooperates with an arcuate extension 44 of the rear housing 24. Together, the arcuate extensions 42 and 44 define a cylindrical side wall 46 extending a full circumference of 360 degrees.

With reference to FIGS. 3-7B, the illustrative sprayhead 14 further includes a flow director, such as a directing plate 50 which is supported in spaced relation to the sprayface 32. A water chamber 52 is defined between the sprayface 32 and the directing plate 50. The directing plate 50 is positioned intermediate the sprayface 32 and a support or cover plate 54. The directing plate 50 may be formed of a polymer, and secured to the sidewall 40 of the sprayhead 14 in a conventional manner, such as via adhesives or ultrasonic welding. In certain illustrative embodiments, the sprayface 20, the sidewall 40 and the directing plate 50 may be integrally formed as a single piece. The directing plate 50 illustratively includes an inlet 56 fluidly coupled to an outlet 58 via a fluid passageway 60 (arrows 61 representing water flow in FIG. 5).

The cover plate 54 may be formed of a polymer and secured to the directing plate 50 via conventional means, such as fasteners 62 received within threaded projections 63. Openings 64 in the rear housing 24 provide clearance for the fasteners 62. Alternatively, adhesives or ultrasonic welding may be used to secure the cover plate 54 to the sprayface 20.

Figure 7A:
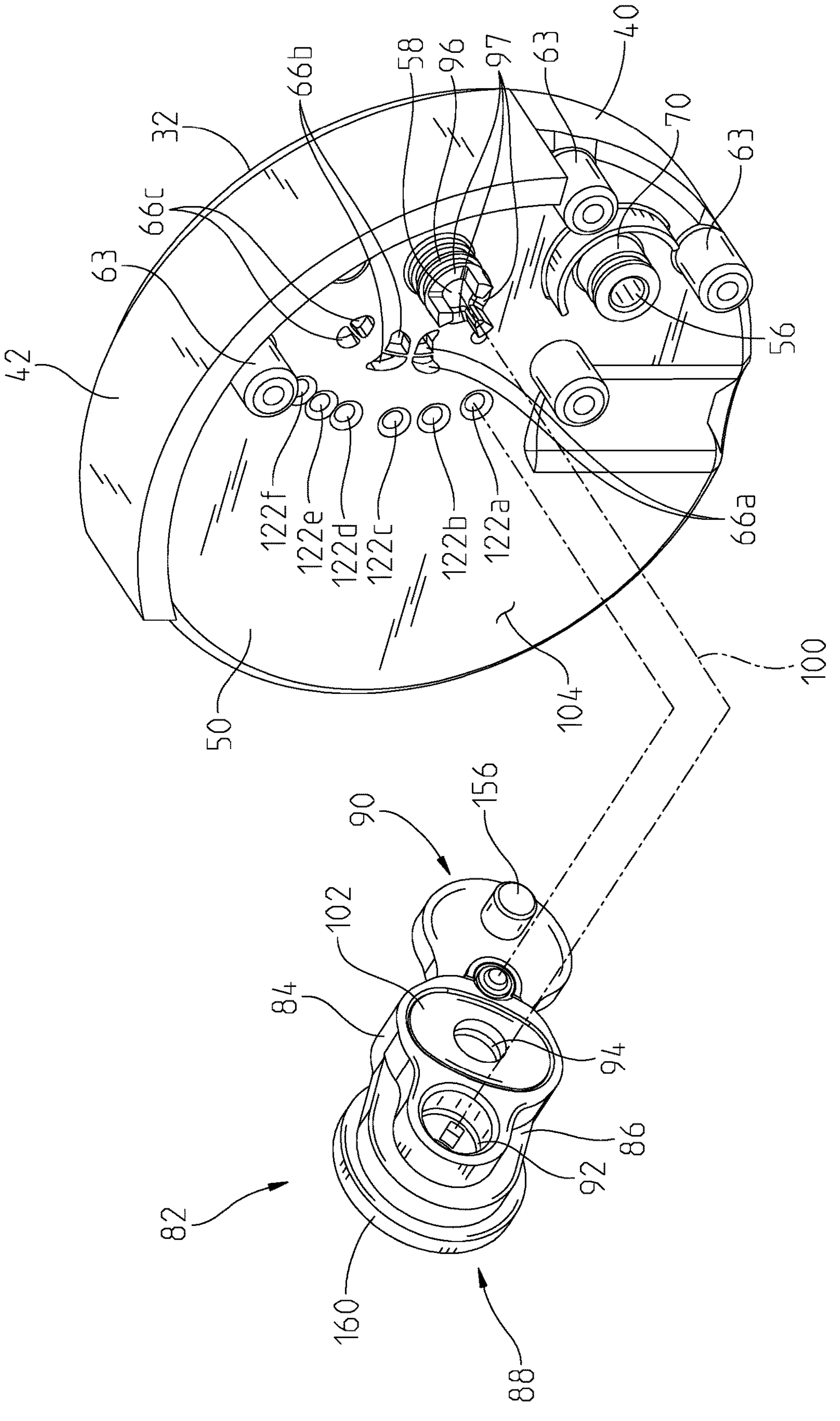
FIG. 7A is a partially exploded perspective view of the showerhead of FIG. 1, showing the pivotable waterway for coupling with the directing plate.
Figure 7B:
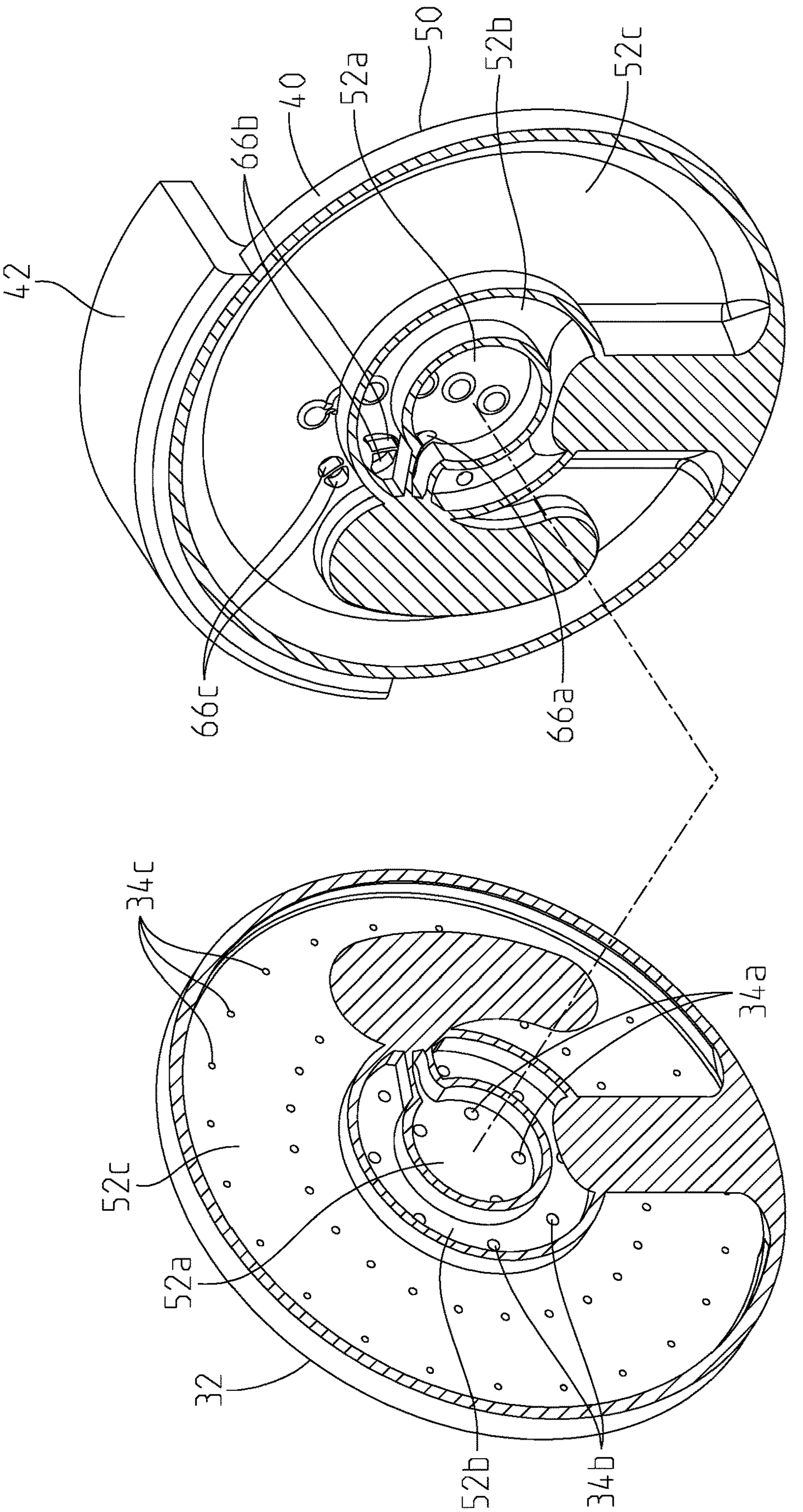
FIG. 7B is a perspective view of the showerhead of FIG. 7A, with a cross-section taken between the directing plate and the sprayface.
Figure 9:
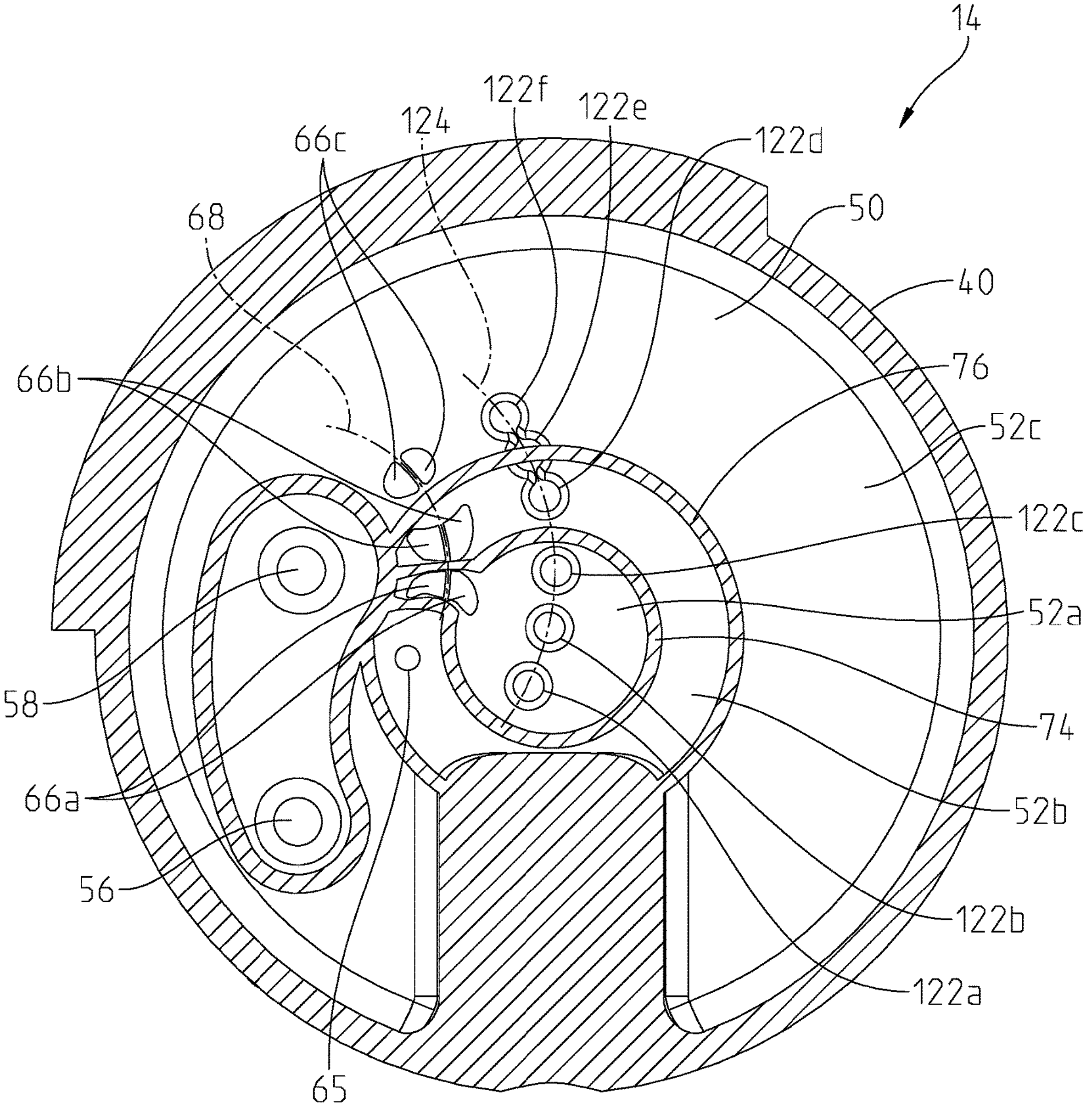
FIG. 9 is a cross-sectional view taken along line 9-9 of FIG. 1.

With reference to FIGS. 7A and 7B, the illustrative water chamber 52 includes separate chamber portions or passageways 52*a*, 52*b* and 52*c*. A plurality of passageway inlets or connecting ports 65, 66*a*, 66*b* and 66*c* extend through the directing plate 50. The connecting ports 65, 66*a*, 66*b* and 66*c* are spaced apart in an arcuate path 68 (FIG. 9). The connecting port 65 provides fluid communication between the water passageway 18 and associated arrangement of spray outlets 34*b* via chamber portion 52*b*. Each of the connecting ports 66*a*, 66*b* and 66*c* provides fluid communication between the water passageway 18 and an associated arrangement of spray outlets 34*a*, 34*b* and 34*c* via chamber portions 52*a*, 52*b* and 52*c*, respectively. The outlet 22 of the water passageway 18 is in fluid communication with the inlet 56 of the directing plate 50 defined by an annular boss 70. An o-ring 71 is received around the boss 70 to seal the inlet 60 of the directing plate 50 to the outlet 22 of the water passageway 18.

Figure 10:
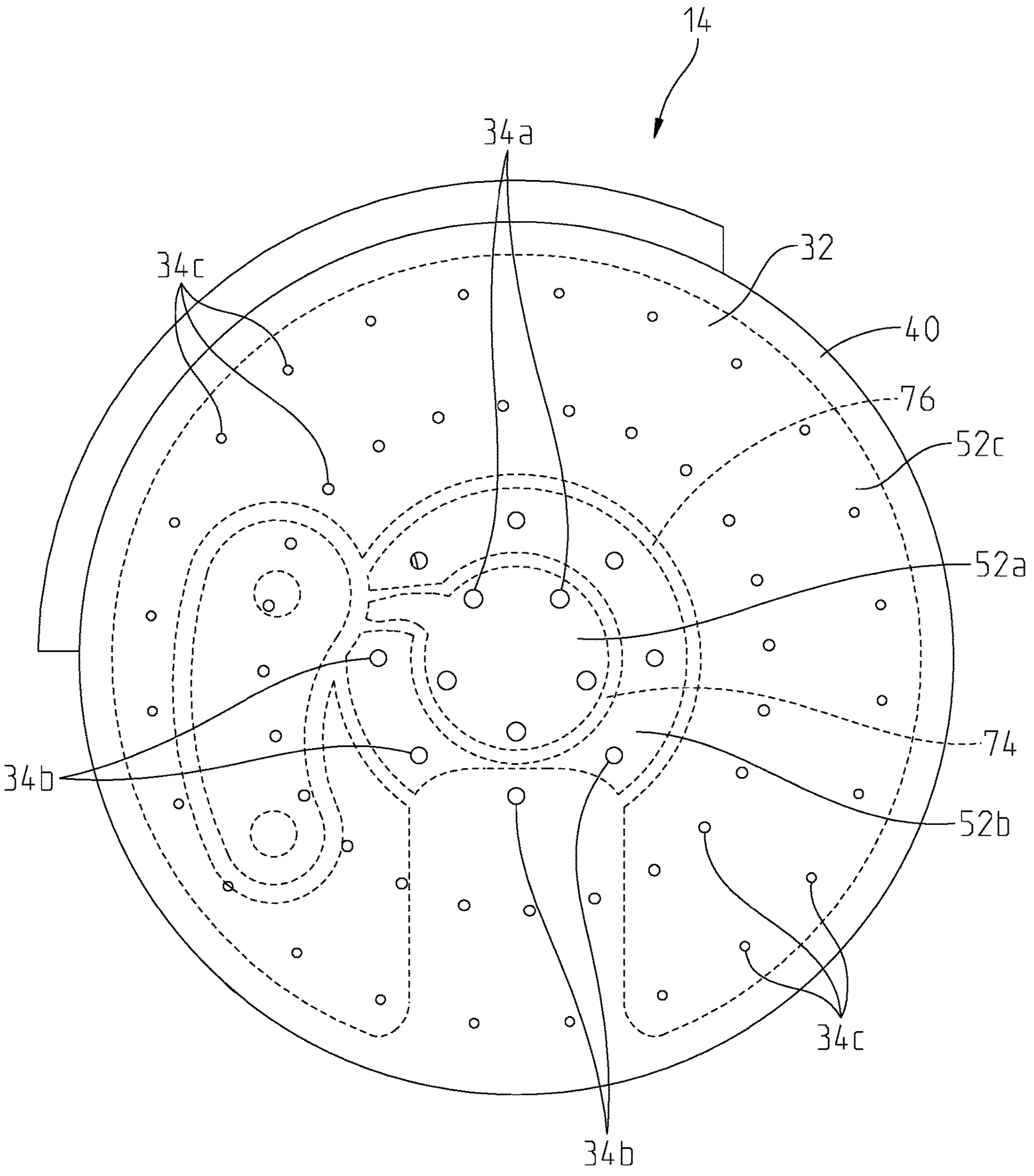
FIG. 10 is a rear plan view of a sprayface of the showerhead of FIG. 1, with the directing plate shown in phantom.

With reference to FIGS. 9 and 10, the first or inner chamber portion 52*a* is in fluid communication with the spray outlets 34*a* and the connecting ports 66*a*. The second or intermediate chamber portion 52*b* is in fluid communication with the spray outlets 34*b* and the connecting ports 66*b*. An arcuate first or inner wall 74 separates the first chamber portion 52*a* from the second chamber portion 52*b*. The third or outer chamber portion 52*c* is in fluid communication with the spray outlets 34*c* and the connecting ports 66*c*. An arcuate second or intermediate wall 76 separates the second chamber portion 52*b* and the third chamber portion 52*c*. The sidewall 40 defines the outermost periphery of the third chamber 52*c*.

Figure 11:
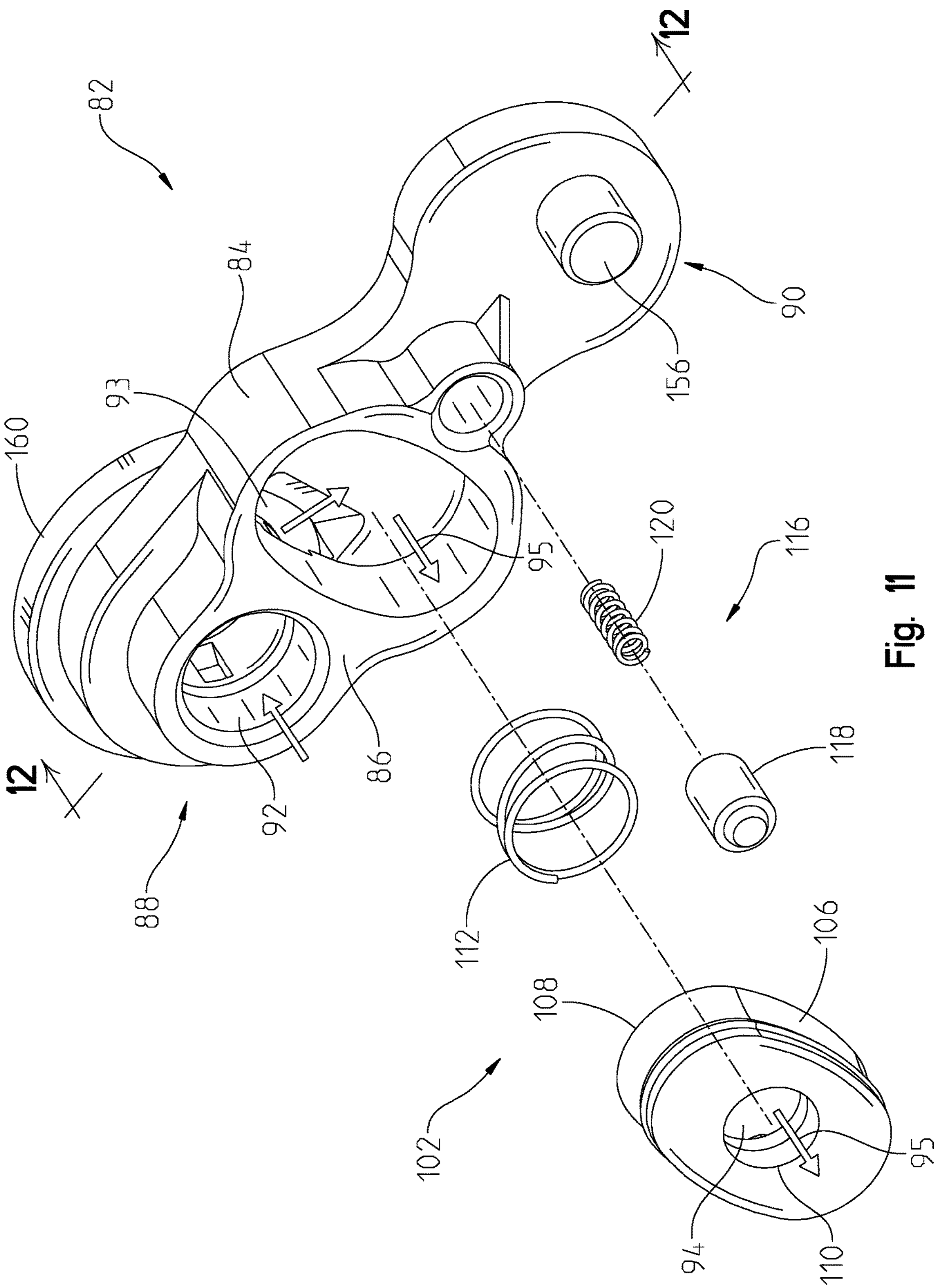
FIG. 11 is an exploded perspective view of the water diverter device of the showerhead of FIG. 1.
Figure 12:
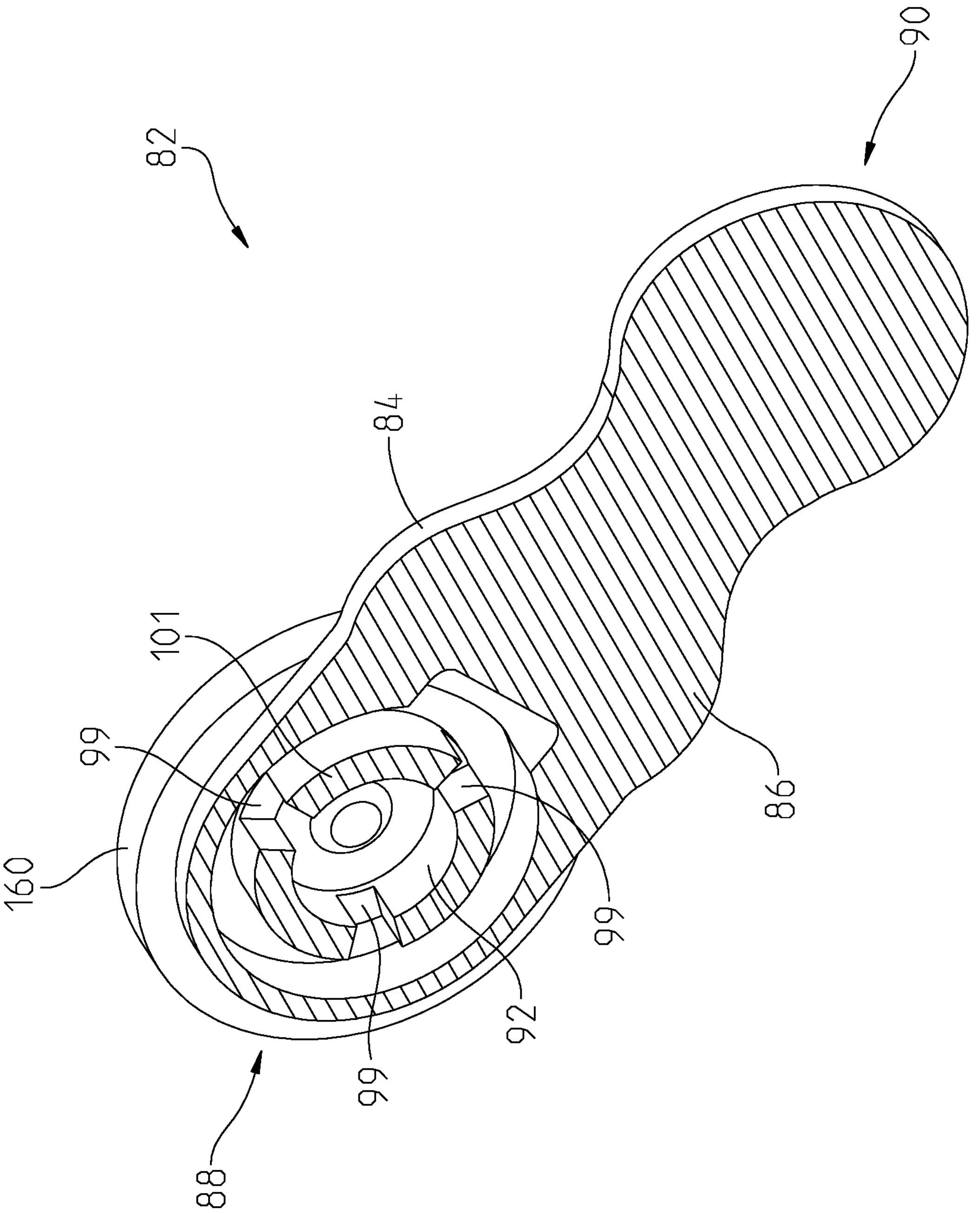
FIG. 12 is a perspective view in cross-section taken along line 12-12 of FIG. 11.

A water diverter device 82 is received with the sprayhead 14 and illustratively includes a pivotable waterway 84 supported by the directing plate 50. With reference to FIGS. 11 and 12, the pivotable waterway 84 may include a diverter body 86 having a proximal end 88 and a distal end 90. An inlet 92 is positioned adjacent the proximal end 88, and an outlet 94 is positioned distally of the inlet 92. A fluid passageway 93 extends within the diverter body 86 between the inlet 92 and the outlet 94 (arrows 95 represent water flow in FIGS. 6 and 11).

With reference to FIGS. 3, 4, 9, 11 and 12, the body 86 of the water diverter device 82 is pivotable about the inlet 92, such that the outlet 94 is moveable along the arcuate path 68 (FIG. 9). As such, the outlet 94 of the diverter body 86 is in selective communication within different ones of the connecting ports 65, 66*a*, 66*b*, 66*c* of the directing plate 50. More particularly, the inlet 92 of the diverter body 86 is in fluid communication with the outlet 58 of the directing plate 50.

With reference to FIGS. 7A and 12, the outlet 58 of the directing plate 50 is illustratively defined by an outlet boss 96 including a plurality of circumferentially spaced outlet ports 97. O-rings 98 illustratively provide a seal between the outlet boss 96 and the inlet 92 of the diverter body 86. Circumferentially spaced inlet ports 99 are defined within a cylindrical sidewall 101 of the inlet 92. Rotational alignment of the outlet ports 97 of the outlet boss 96 and the inlet ports 99 of the sidewall 101 fluidly couple the outlet 58 with the inlet 92. As such, the outlet boss 96 of the directing plate 50 fluidly and pivotably couples with the inlet 92 of the pivotable waterway 84. The outlet boss 96 of the directing plate 50 and the inlet 92 of the pivotable waterway 84 define a waterway pivot axis 100 about which the diverter body 86 of the pivotable waterway 84 rotates. As shown in FIGS. 8A-8F, the pivot axis 100 of the pivotable waterway 84 is offset from the center sprayhead axis 36.

Illustratively, the pivotable waterway 84 of the water diverter device 82 supports a compliant seal 102 to open/close each connecting port 66*a*, 66*b* and 66*c* to the desired spray setting along the arcuate path 68. More particularly, the outlet 94 illustratively includes a compliant seal 102 to cooperate with a rear surface 104 of the directing plate 50, thereby providing a seal between the outlet 94 of the diverter body 86 and selective connecting ports 66*a*, 66*b* and 66*c*. The compliant seal 102 illustratively includes a gasket 106 having a resilient cup 108 (e.g., formed of an elastomer) defining an opening 110. A spring 112 is operably coupled to the cup 108 to bias the gasket 106 toward the rear surface 104 of the directing plate 50. The connecting ports 66*a*, 66*b* and 66*c* are shaped to cooperate with the opening 110 of the gasket 106 (i.e., the shape of the cup 108 and the position of the opening 110 in any particular function, for example, as shown in FIGS. 8A-8F). The design is configured to maximize the area between the opening 110 and respective connection port(s) 66*a*, 66*b* and 66*c* (e.g., to reduce flow restriction), while minimizing the potential risk for cross-function leakage (e.g., from one function to next function).

A spring biased detent 116 is supported by the diverter body 86 distally of the outlet 94. The detent 116 includes a pin 118 operably coupled to a spring 120 for biasing the pin 118 toward the directing plate 50. With reference to FIG. 9, the detent 116 is configured to be received within a selected retaining recess 122*a*, 122*b*, 122*c*, 122*d*, 122*e* and 122*f* formed in the rear surface 104 of the directing plate 50. The retaining recesses 122*a*, 122*b*, 122*c*, 122*d*, 122*e* and 122*f* are positioned in an arcuate path 124 extending parallel to the arcuate path 68 of the connecting ports 66*a*, 66*b* and 66*c*. More particularly, each retaining recess 122*a*, 122*b*, 122*c*, 122*d*, 122*e* and 122*f* corresponds to an operating mode of the showerhead 10 as defined by the outlet 94 of the water diverter device 82 cooperating with a corresponding connecting port(s) 66*a*, 66*b* and 66*c* of the directing plate 50.

Figure 3:
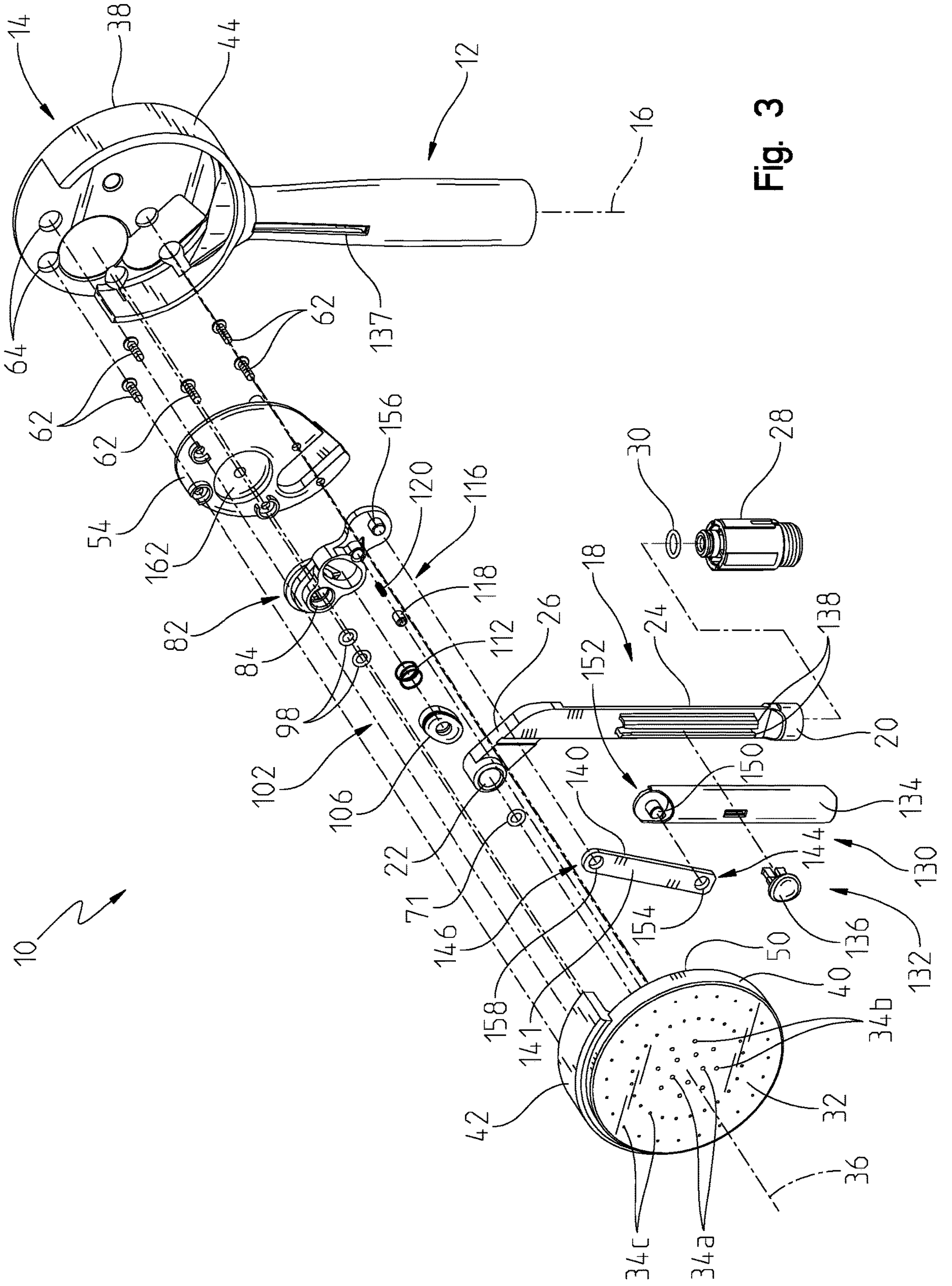
FIG. 3 is a front exploded perspective view of the showerhead of FIG. 1.
Figure 4:
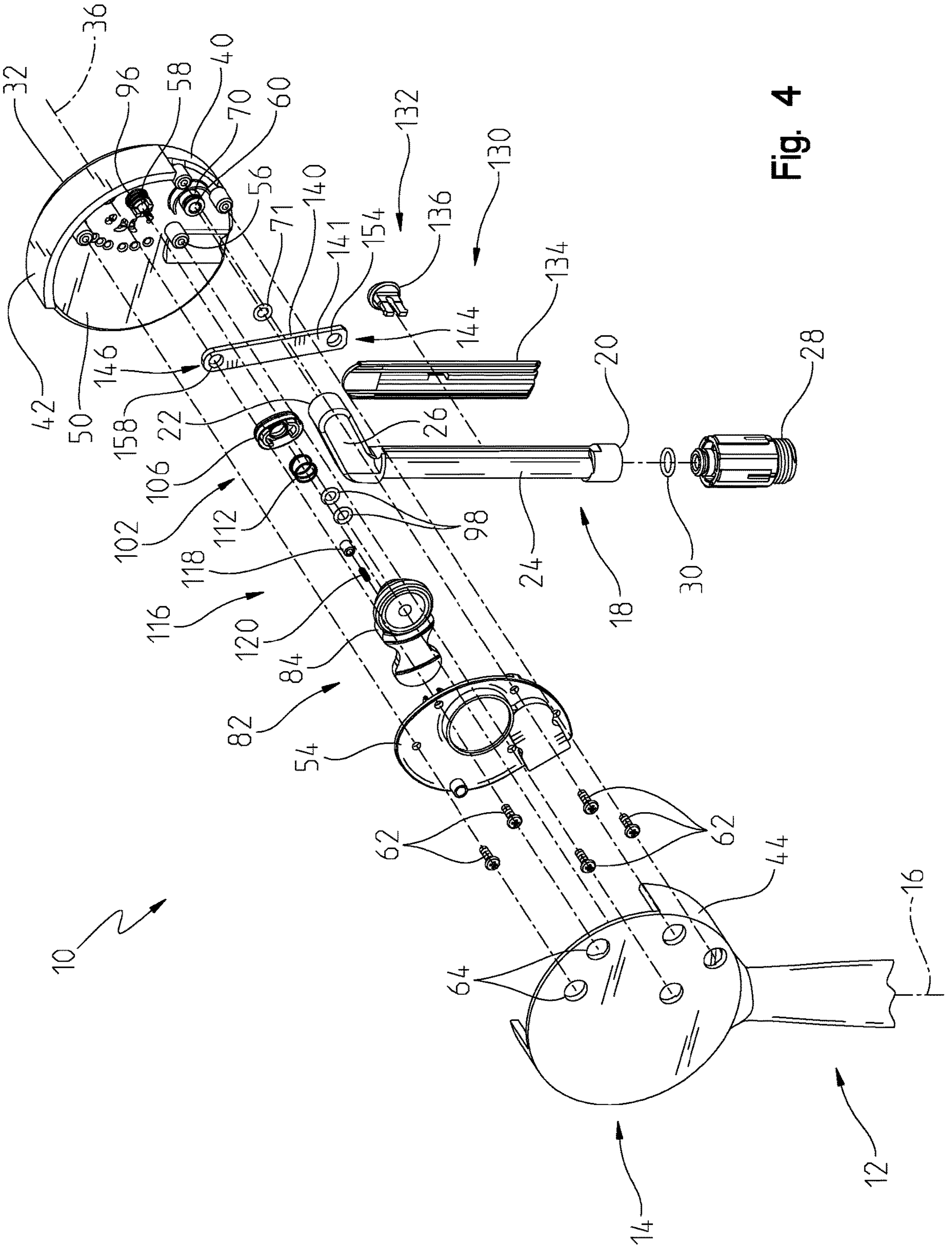
FIG. 4 is a rear exploded perspective of the showerhead of FIG. 1.
Figure 5:
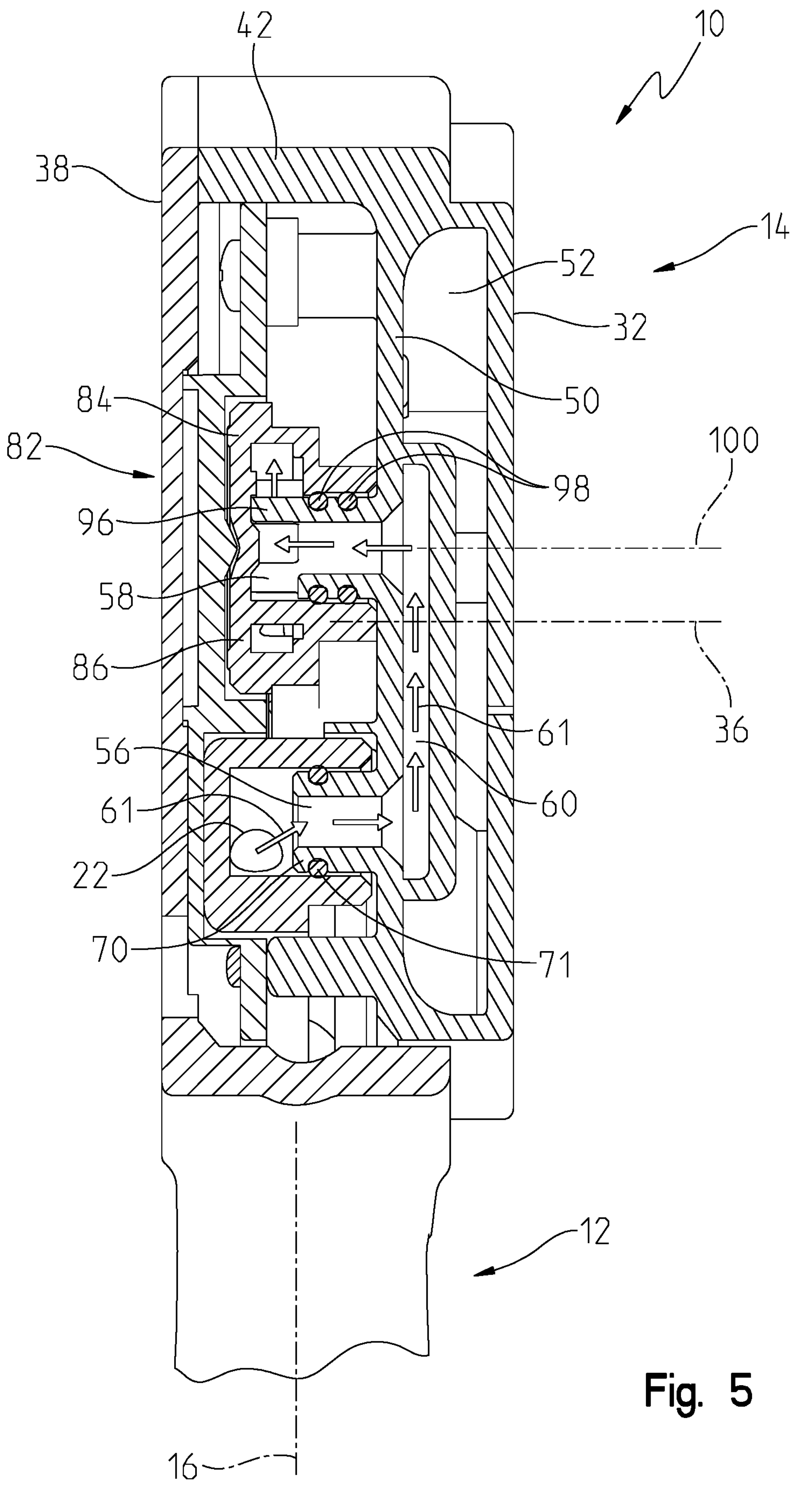
FIG. 5 is a cross-sectional view taken along line 5-5 of FIG. 1, showing an illustrative fluid flow path within the directing plate of the showerhead.
Figure 6:
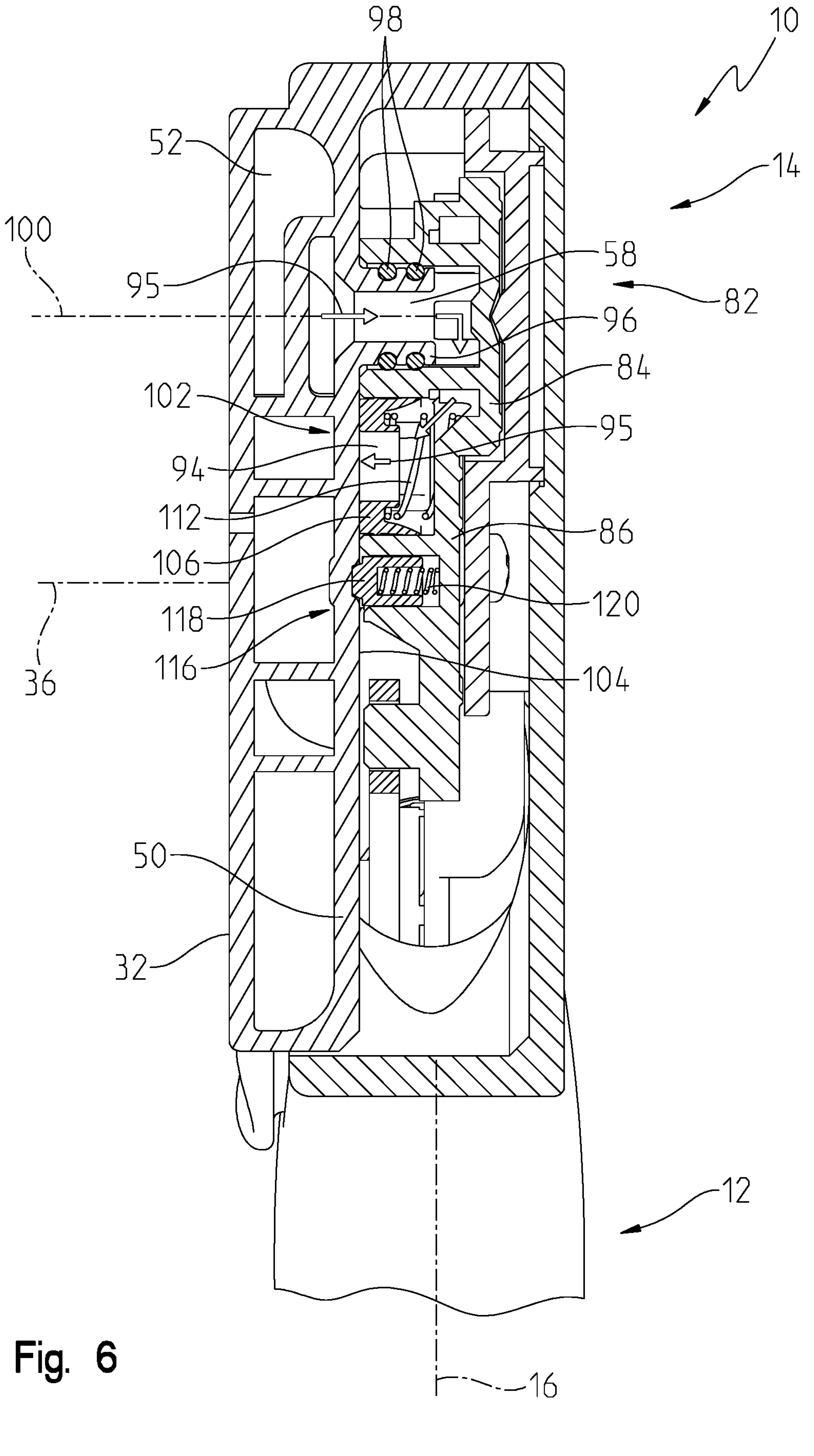
FIG. 6 is a cross-sectional view taken along line 6-6 of FIG. 1, showing an illustrative fluid flow path within the pivotable waterway of the showerhead.

With reference to FIGS. 3 and 4, the driving mechanism 130 is operably coupled to the water diverter device 82 adjacent the distal end 90 of the diverter body 86. The driving mechanism 130 illustratively includes a user interface 132, such as a slide or carriage 134 coupled to a button 136, slidably supported for axial movement parallel to the longitudinal axis 16 of the handle 12. The carriage 134 is aligned with the axis 16 of the water passageway 18 and handle 12, and configured to slide axially along the handle 12. The button 136 is configured to move within a slot 137 formed in the handle 12. More particularly, the carriage 134 is illustratively configured to slide along rails 138 supported by the water passageway 18 by a user sliding the button 136 up and down within the slot 137.

With reference to FIGS. 3, 4 and 8A-8F, a connector 140 extends between the carriage 134 and the pivotable waterway 84 such that axial movement of the carriage 134 is translated into rotational movement of the pivotable waterway 84. More particularly, the illustrative connector 140, may include a connecting arm 141, coupling the user interface 132 to the distal end 90 of the diverter body 86, wherein axial movement of the user interface 132 is translated into pivoting movement of the diverter body 86. The connecting arm 141 illustratively includes a first end 142 supported by a first pivot coupling 144, and a second end 146 supported by a second pivot coupling 148.

The first pivot coupling 144 is illustratively defined by a boss 150 at a distal end 152 of the carriage 134 received within an opening 154 proximate the first end 142 of the connecting arm 140. The second pivot coupling 148 is illustratively defined by a boss 156 at the distal end 90 of the diverter body 86 received within an opening 158 proximate the second end 146 of the connecting arm 141. The distal end 90 of the diverter body 86 includes a circular projection 160 configured to be rotatably supported within a recess 162 of the cover plate 54, thereby providing additional support to the diverter body 86.

In operation, spray force through the spray outlets 34*a*, 34*b* and 34*c* illustratively changes (e.g., increases) as the outlet 94 of the water diverter device 82 moves along the arcuate path 68 in fluid communication which successive ones of the connecting ports 66*a*, 66*b* and 66*c*. As further detailed herein, the spray outlets 34*a*, 34*b* and 34*c* illustratively include a plurality of different sets of spray outlets 34*a*, 34*b* and 34*c* having different cross-sectional flow areas to provide different spray forces. In one illustrative embodiment, the first annular set of spray outlets 34*a* includes five circumferentially spaced spray outlets 34*a*, and the second annular set of spray outlets 34*b* includes eight circumferentially spaced spray outlets 34*b*. The third annular set of spray outlets 34*c* illustratively includes an inner ring of twenty-four spray outlets 34*c* and an outer ring of twenty-four spray outlets 34*c*. It should be appreciated that the arrangement, number and size of the spray outlets 34 may vary.

Figure 8B:
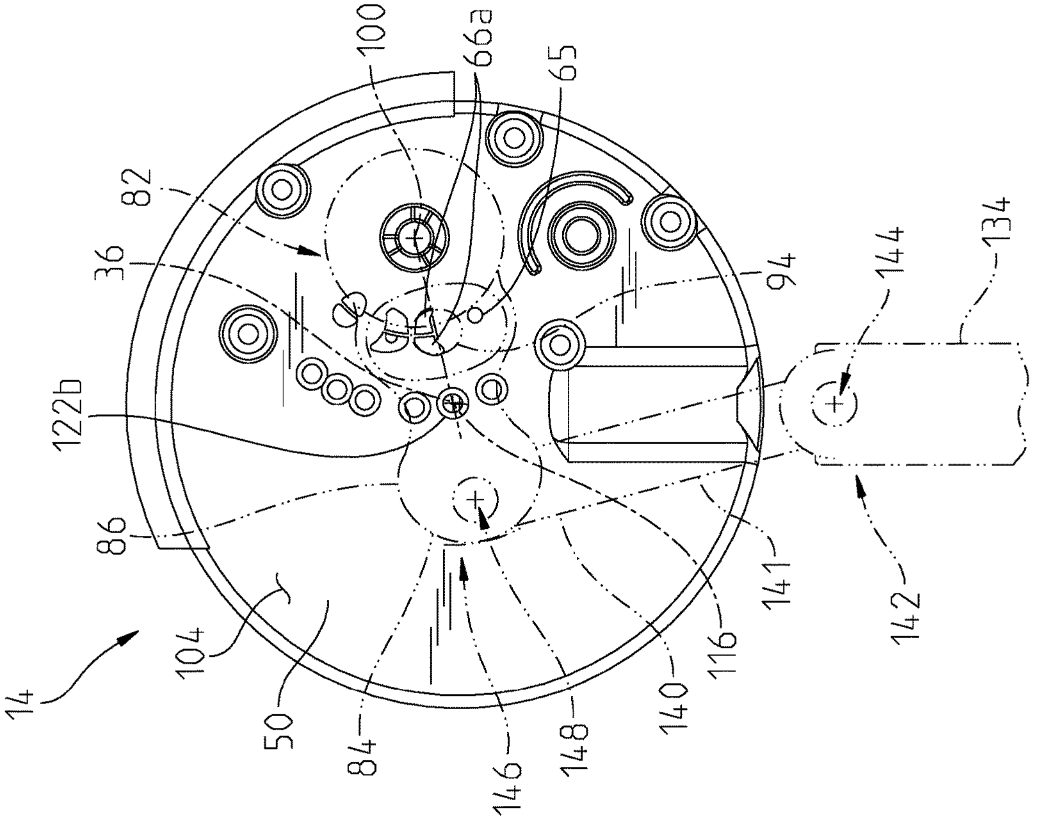
FIG. 8B is a rear perspective view similar to FIG. 8A, showing the water diverter device and the driving mechanism in phantom and in a second operating mode.
Figure 8A:
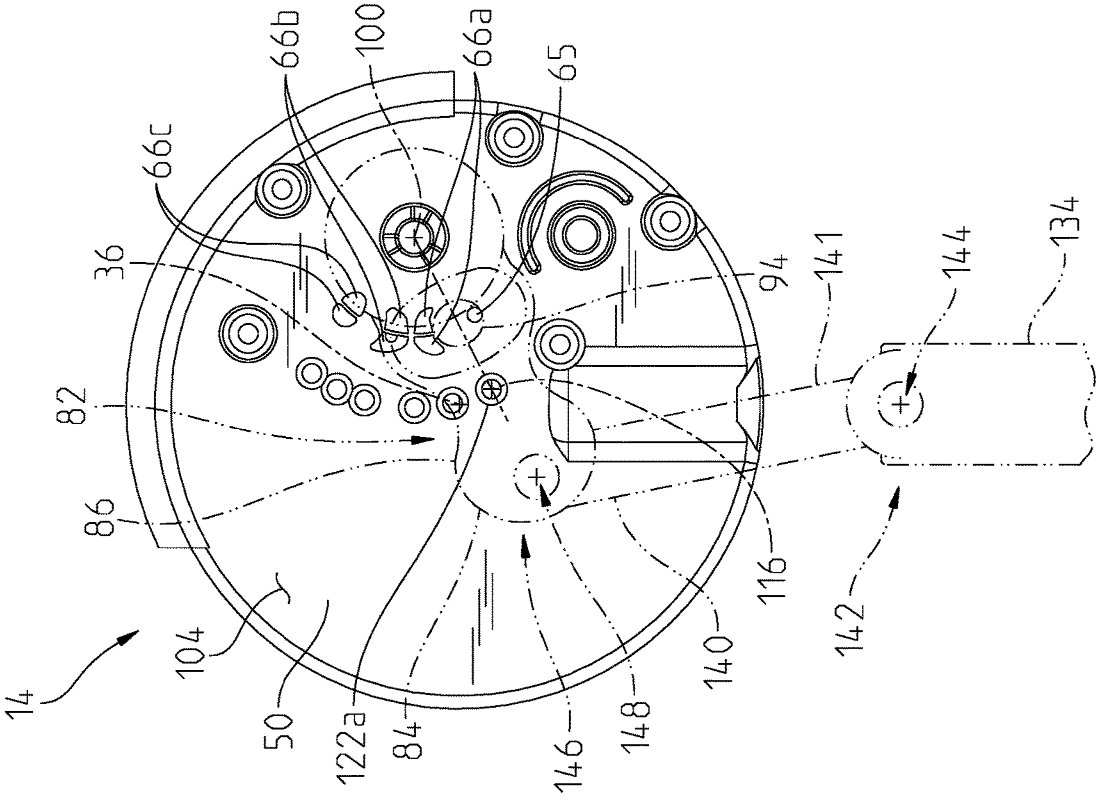
FIG. 8A is a rear perspective view in partial cross-section of the directing plate of the sprayhead of FIG. 1, showing the water diverter device and the driving mechanism in phantom and in a first operating mode.

With reference to FIGS. 8A-10, an illustrative operation of the diverter device 82 of the showerhead 10 is shown. FIG. 8A shows the diverter device 82 in a first mode of operation where water is substantially, but not entirely, blocked from flowing through any of the spray outlets 34*a*, 34*b* and 34*c*. More particularly, this mode may be called an "off", "pause" or "trickle" mode where limited water flows out of spray outlets 34*b*. As shown, the outlet 94 of the pivotable waterway 84 is sealed with the rear surface 104 of the directing plate 50 thereby preventing water flow to any of the connecting ports 66*a*, 66*b* and 66*c*. However, the outlet 94 of the diverter device 82 is in fluid communication with the connecting port 65 which provides restricted water flow to the chamber portion 52*b*. As such, limited water flows through the chamber portion 52*b* and out spray outlets 34*b*. In the first mode of operation of FIG. 8A, the flow path between the diverter body 86 is restricted since the inlet ports 99 of the inlet 92 are only partially aligned with the outlet ports 97 of the outlet 58, and/or the connecting port 65 in fluid communication with the chamber portion 52*b* is of reduced size. In this position, the detent 116 of the pivotable waterway 84 is received within the retaining recess 122*a* of the directing plate 50.

FIG. 8B shows the diverter device 82 in a second mode of operation where water flows through spray outlets 34*a*. More particularly, the diverter body 86 of the pivotable waterway 84 is pivoted about the pivot axis 100 defined by the inlet 92 (clockwise from FIG. 8A) such that the outlet 94 is fluidly coupled to the connecting port 66*a*. In an illustrative embodiment, the diverter body 86 in FIG. 8B is pivoted by approximately 15 degrees from the position shown in FIG. 8A. The outlet 94 of the diverter device 82 is in full fluid connection with the connecting port 66*a*. As such, water flows from the connecting port 66*a* through chamber portion 52*a* and out spray outlets 34*a*. In this position, the detent 116 of the pivotable waterway 84 is received within the retaining recess 122*b* of the directing plate 50.

Figure 8D:
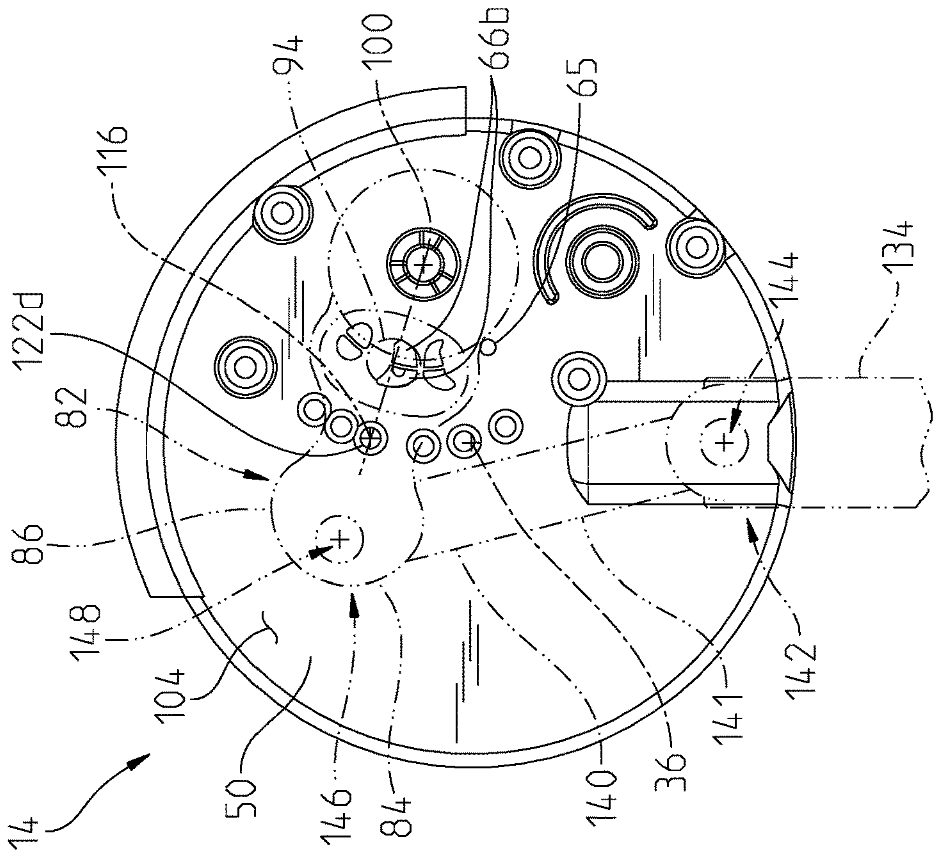
FIG. 8D is a rear perspective view similar to FIG. 8A, showing the water diverter device and the driving mechanism in phantom and in a fourth operating mode.
Figure 8C:
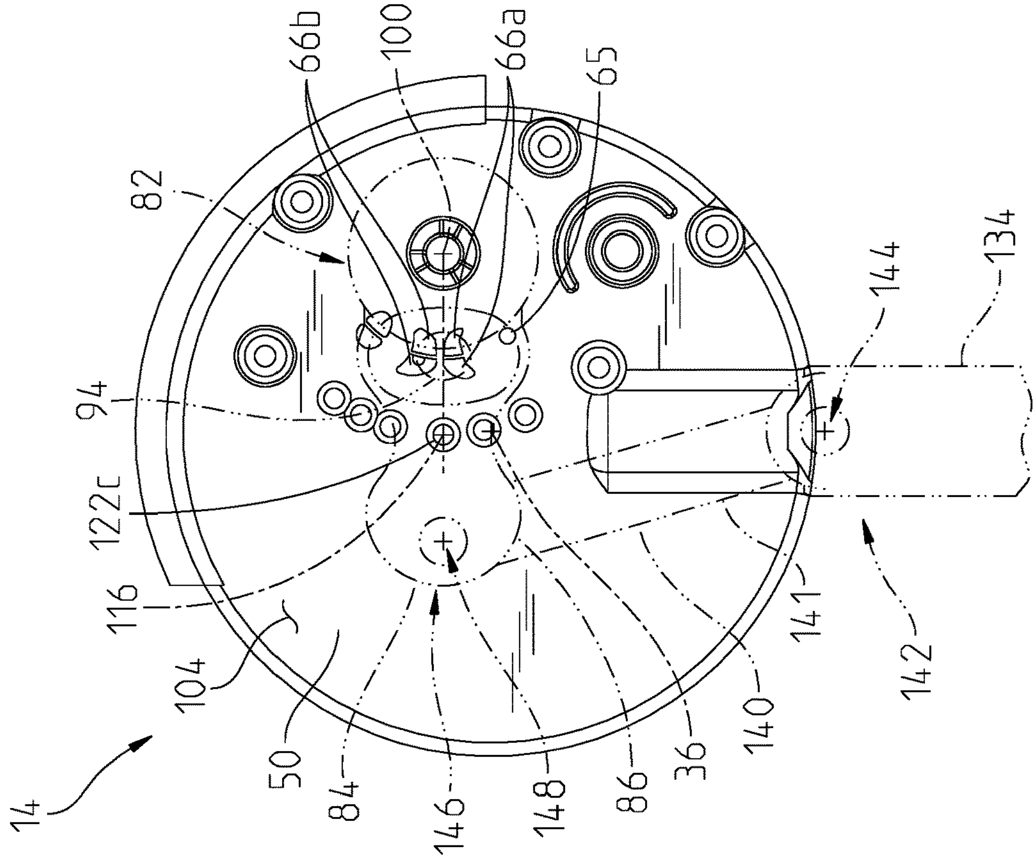
FIG. 8C is a rear perspective view similar to FIG. 8A, showing the water diverter device and the driving mechanism in phantom and in a third operating mode.

FIG. 8C shows the diverter device 82 in a third mode of operation where water flows through spray outlets 34*a* and 34*b*. More particularly, the diverter body 86 of the pivotable waterway 84 is pivoted about the pivot axis 100 defined by the inlet 92 (clockwise from FIG. 8B) such that the outlet 94 is fluidly coupled to the connecting ports 66*a* and 66*b*. In an illustrative embodiment, the diverter body 86 in FIG. 8C is pivoted by approximately 15 degrees from the position shown in FIG. 8B (i.e., approximately 30 degrees from the position shown in FIG. 8A). The outlet 94 of the diverter device 82 is in partial fluid connection with the connecting ports 66*a* and 66*b*. As such, water flows from the connecting ports 66*a* and 66*b* through chamber portions 52*a* and 52*b*, and out spray outlets 34*a* and 34*b*. In this position, the detent 116 of the pivotable waterway 84 is received within the retaining recess 122*c* of the directing plate 50.

FIG. 8D shows the diverter device 82 in a fourth mode of operation where water flows through spray outlets 34*b*. More particularly, the diverter body 86 of the pivotable waterway 84 is pivoted about the pivot axis 100 defined by the inlet 92 (clockwise from FIG. 8C) such that the outlet 94 is fluidly coupled to the connecting port 66*b*. In an illustrative embodiment, the diverter body 86 in FIG. 8D is pivoted by approximately 15 degrees from the position shown in FIG. 8C (i.e., approximately 45 degrees from the position shown in FIG. 8A). The outlet 94 of the diverter device 82 is in full fluid connection with the connecting port 66*b*. As such, water flows from the connecting port 66*b* through chamber portion 52*b* and out spray outlets 34*b*. In this position, the detent 116 of the pivotable waterway 84 is received within the retaining recess 122*d* of the directing plate 50.

Figure 8E:
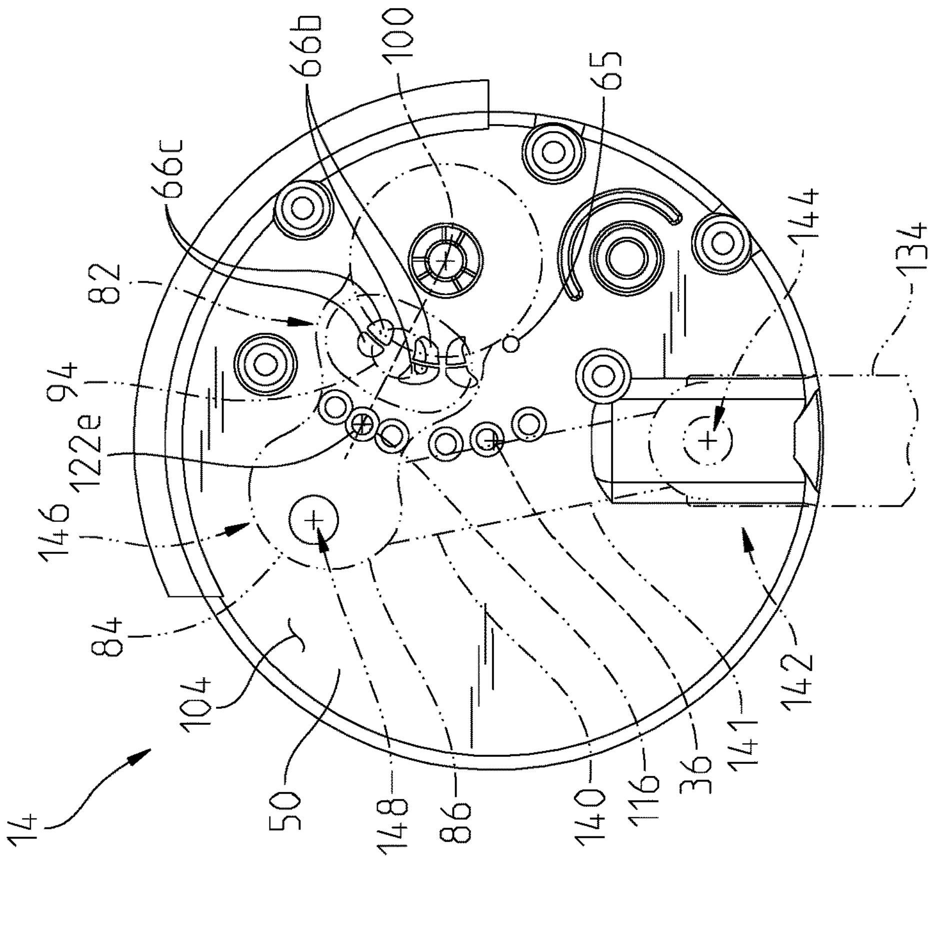
FIG. 8E is a rear perspective view similar to FIG. 8A, showing the water diverter device and the driving mechanism in phantom and in a fifth operating mode.

FIG. 8E shows the diverter device 82 in a fifth mode of operation where water flows through spray outlets 34*b* and 34*c*. More particularly, the diverter body 86 of the pivotable waterway 84 is pivoted about the pivot axis 100 defined by the inlet 92 (clockwise from FIG. 8D) such that the outlet 94 is fluidly coupled to the connecting ports 66*b* and 66*c*. In an illustrative embodiment, the diverter body 86 in FIG. 8E is pivoted by approximately 10 degrees from the position shown in FIG. 8D (i.e., approximately 55 degrees from the position shown in FIG. 8A). The outlet 94 of the diverter device 82 is in partial fluid connection with the connecting ports 66*b* and 66*c*. As such, water flows from the connecting ports 66*b* and 66*c* through chamber portions 52*b* and 52*c*, and out spray outlets 34*b* and 34*c*. In this position, the detent 116 of the pivotable waterway 84 is received within the retaining recess 122*e* of the directing plate 50.

Figure 8F:
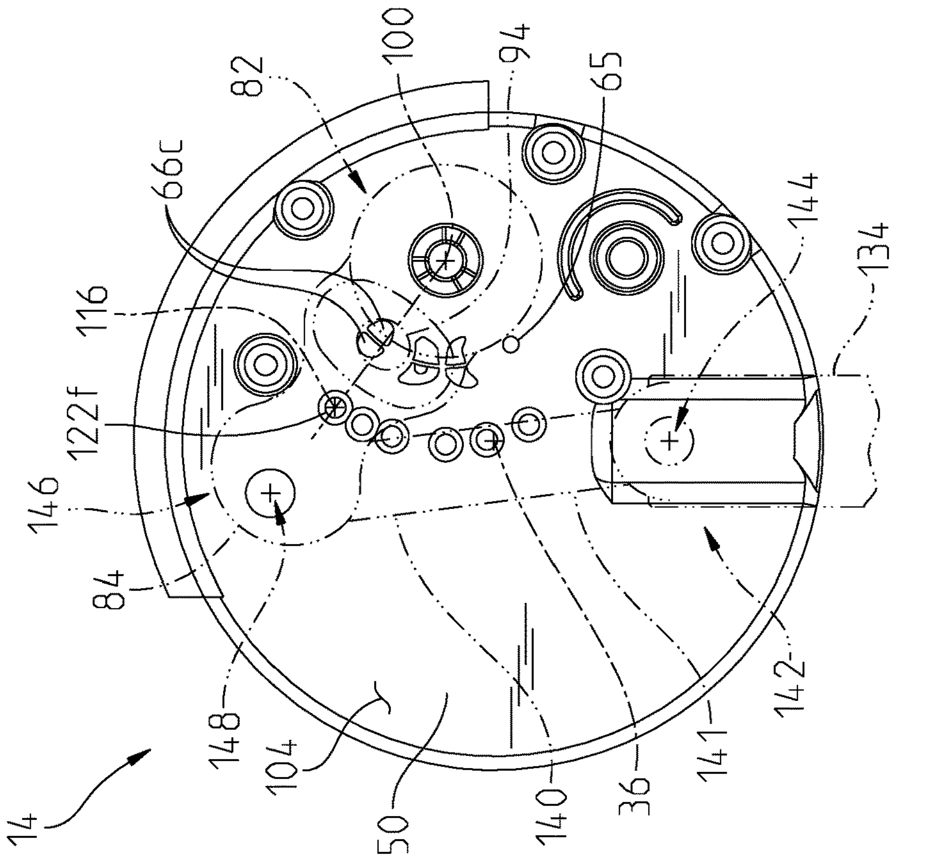
FIG. 8F is a rear perspective view similar to FIG. 8A, showing the water diverter device and the driving mechanism in phantom and in a sixth operating mode.

FIG. 8F shows the diverter device 82 in a sixth mode of operation where water flows through spray outlets 34*c*. More particularly, the diverter body 86 of the pivotable waterway 84 is pivoted about the pivot axis 100 defined by the inlet 92 (clockwise from FIG. 8E) such that the outlet 94 is fluidly coupled to the connecting port 66*c*. In an illustrative embodiment, the diverter body 86 in FIG. 8F is pivoted by approximately 10 degrees from the position shown in FIG. 8E (i.e., approximately 65 degrees from the position shown in FIG. 8A). The outlet 94 of the diverter device 82 is in full fluid connection with the connecting port 66*c*. As such, water flows from the connecting port 66*c* through chamber portion 52*c* and out spray outlets 34*c*. In this position, the detent 116 of the pivotable waterway 84 is received within the retaining recess 122*f* of the directing plate 50.

The association of outlets 34*a*, 34*b* and 34*c* to functional settings is created such that there is a change of apparent force as the settings change. The association of settings to connecting ports 66*a*, 66*b* and 66*c* are organized circumferentially such that rotation from a first to a last setting increases or decreases in apparent spray force.

Assuming that flow rate (which can be controlled by a conventional flow regulator in series with the water passageway 18) and water pressure (which can be controlled by the water supply providing water to the water passageway 18) are substantially constant, then apparent spray force of water discharged from the spray outlets 34 can be approximated by the combined outlet flow area (FIG. 10) for each function as defined by the cross-sectional are of the combined active spray outlets 34. As the outlet flow area increases, the water flow velocity will decrease accordingly. Generally, the combined outlet flow area increases as a user slides the button 136 up, and decreases as a user slides the button 136 down. Illustrative combined outlet flow areas per function represented by FIGS. 8A-8F area provided in the following table.

| Illustrative Function | Active Spray Outlets | Combined Flow Area |
|---|---|---|
| FIG. 8A | 34b | nominal |
| FIG. 8B | 34a | 16 $mm^2$ |
| FIG. 8C | 34a and 34b | 36 $mm^2$ |
| FIG. 8D | 34b | 20 $mm^2$ |
| FIG. 8E | 34b and 34c | 170 $mm^2$ |
| FIG. 8F | 34c | 150 $mm^2$ |

It should be appreciated that the number, size and arrangement of spray outlets 34 may vary depending upon the desired effects of the discharged water (e.g., apparent spray force, spray coverage pattern and/or spray coverage area).

With reference to FIGS. 13-16, further illustrative showerheads 210, 310 are shown each including a sprayhead 214, 314 angled relative to the handle 212, 312, respectively. Many of the elements of showerheads 210, 310 are similar to those detailed above in connection with showerhead 10. As such, in the following description and accompany drawing figures, like reference numbers identify similar elements.

Illustratively, the sprayhead 214, 314 is angled downwardly toward the handle 212, 312 by approximately 15 degrees. In other words, the sprayhead axis 36 illustratively extends and an angle of approximately 75 degrees to the longitudinal axis 16. In such a design, a connector 240, 340 of the respective driving mechanism 230, 330 may be formed of a compliant material such that it has rigidity in tension and compression, but flexibility in bending moment to allow for the actuation of the respective pivotable waterway 284, 384 without binding the connector 240, 340.

Figure 13:
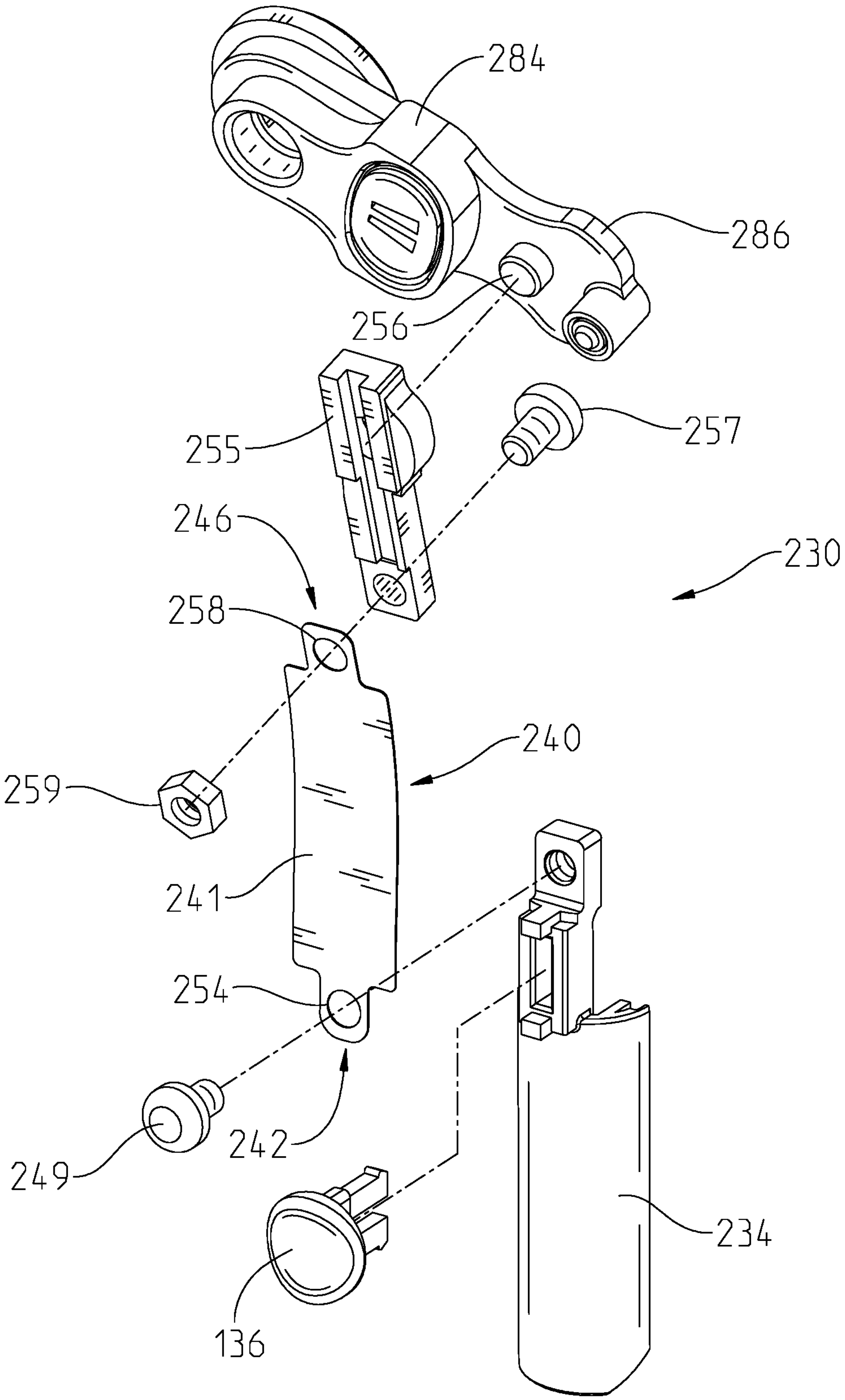
FIG. 13 is an exploded perspective view of an illustrative driving mechanism including a first compliant connector.
Figure 14:
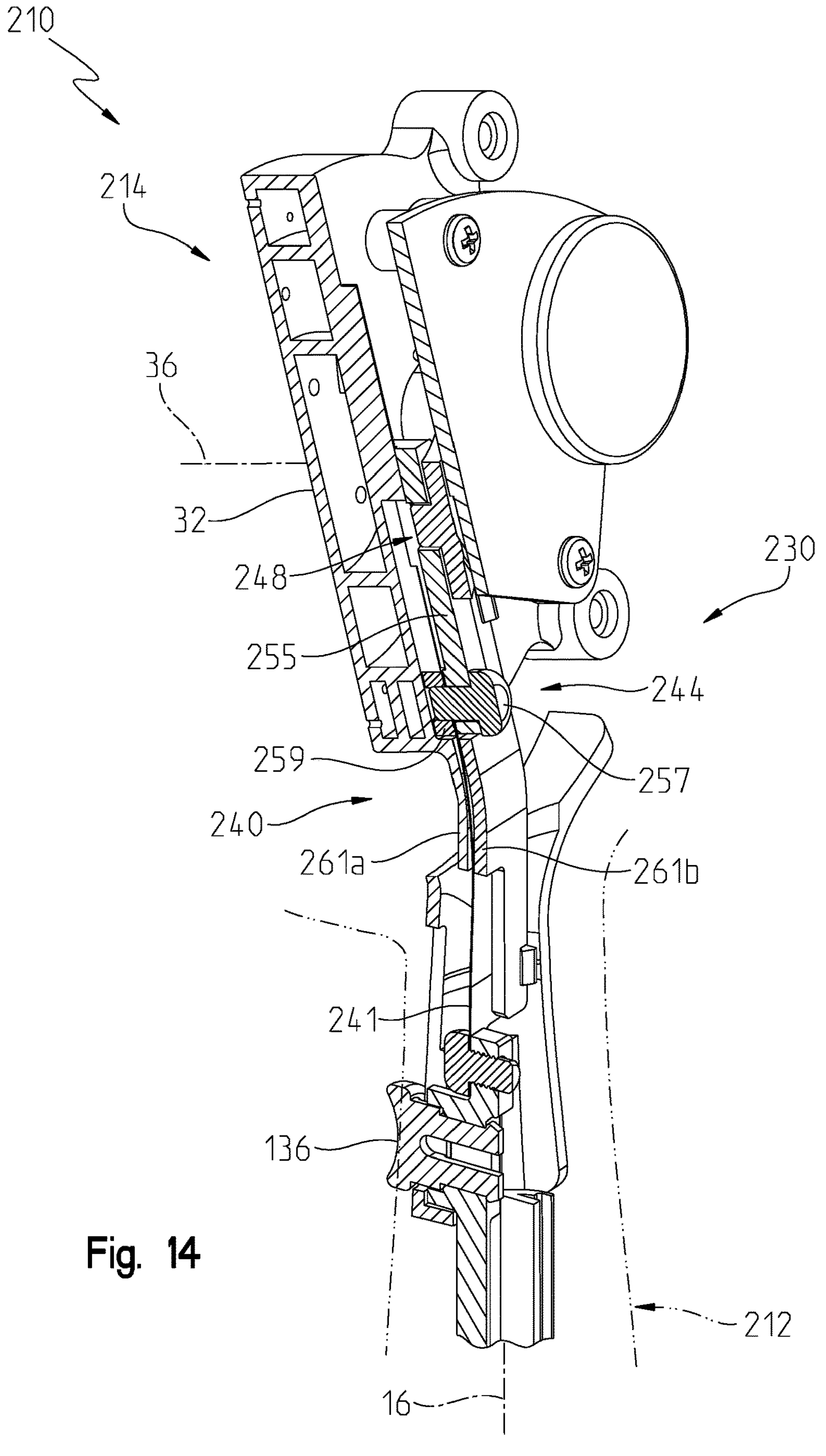
FIG. 14 is a partial perspective view in cross-section of a showerhead including the driving mechanism of FIG. 13.

FIGS. 13 and 14 show an illustrative driving mechanism 230 including a first compliant connector 240 in the form of a compliant arm or push rod 241. A first end 242 of the arm 241 is illustratively coupled to a slide or carriage 234 by a fastener or pin 249 received within an opening 254. A coupling block 255 is coupled to a second end 246 of the arm 241 via a first pivot coupling 244. The first pivot coupling 244 is illustratively defined by a bolt 257 extending through an opening 258 and threadably coupled with a nut 259. A second pivot coupling 248 is illustratively defined by the boss 256 of a diverter body 286.

As shown in FIG. 14, the compliant arm 241 is configured to bend between the handle 212 and the sprayhead 214. Opposing rails 261*a* and 261*b* receive and prevent buckling of the compliant arm 231. The compliant arm 241 may be formed of a resilient material, such as a thin strip of metal or polymer.

Figure 15:
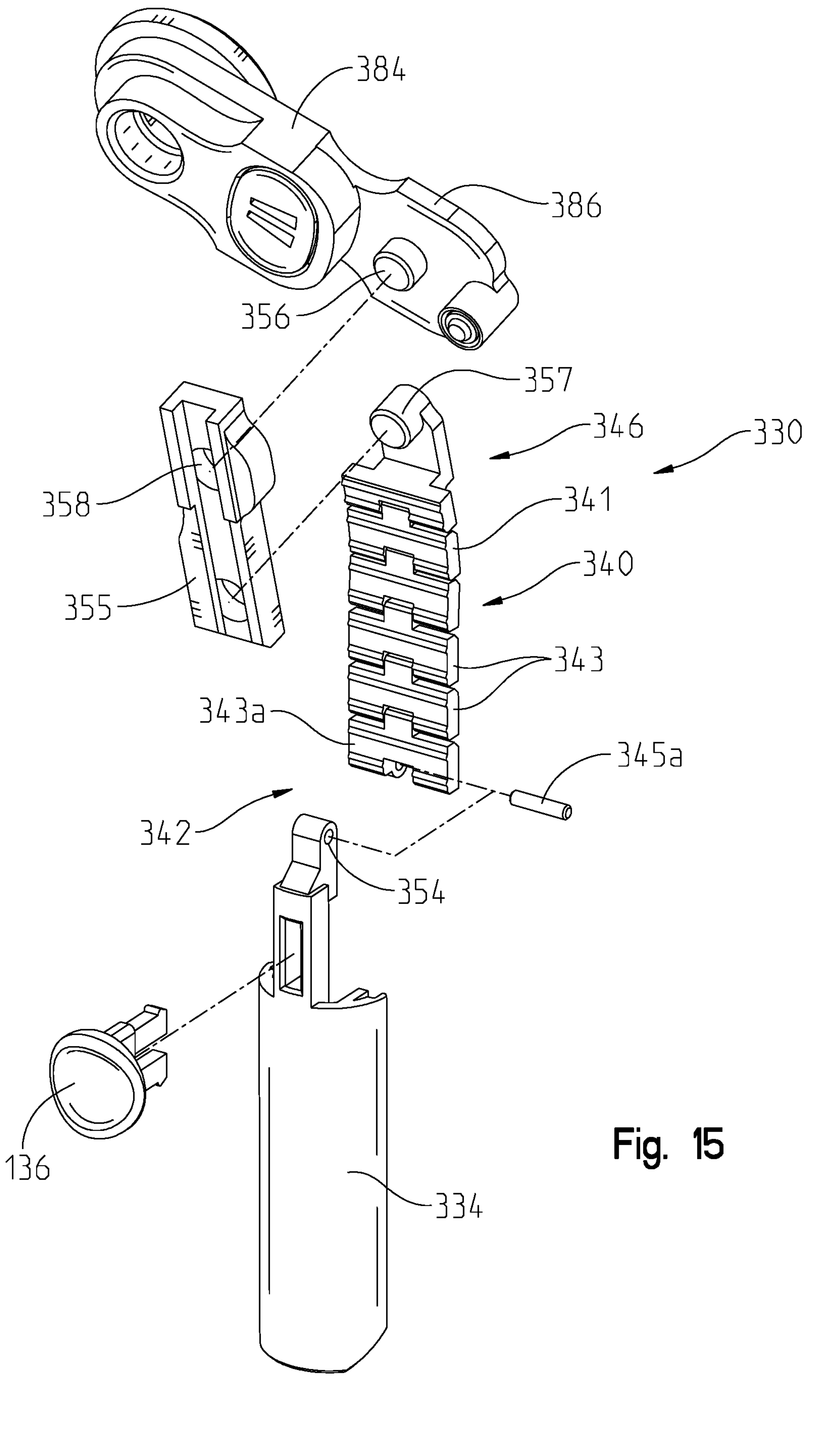
FIG. 15 is an exploded perspective view of an illustrative driving mechanism including a second compliant connector.
Figure 16:
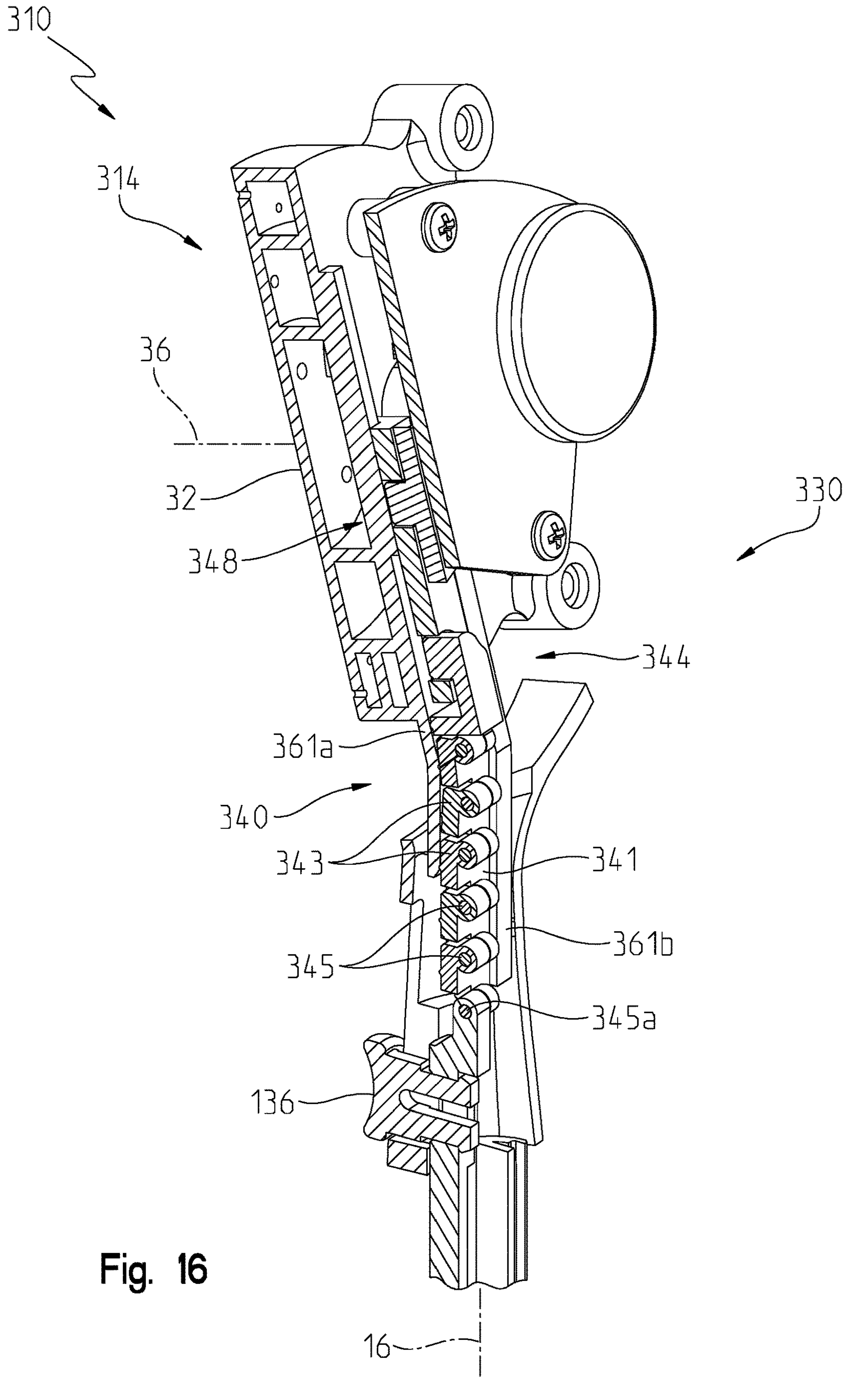
FIG. 16 is a partial perspective view in cross-section of a showerhead including the driving mechanism of FIG. 15.

FIGS. 15 and 16 show an illustrative driving mechanism 330 including a second compliant connector 340 in the form of a flexible chain 341. The flexible chain 341 is illustratively formed of a plurality of links 343 (e.g., formed of a polymer) and connecting pins 345 (e.g., formed of metal). A first end 342 of the chain 341 is illustratively coupled to a slide or carriage 334 by a pin 335*a* received within an opening 354 and a link 343*a* of the chain 341. A coupling block 355 is coupled to a second end 346 of the chain 341 via a first pivot coupling 344. The first pivot coupling 344 is illustratively defined by a boss 357 supported at the second end 346 of the chain 341 and received within an opening 358 of the coupling block 355. A second pivot coupling 348 is illustratively defined by the boss 356 of the diverter body 386.

As shown in FIG. 16, the chain 341 is configured to bend between the handle 312 and the sprayhead 314. Opposing rails 361*a* and 361*b* receive and prevent buckling of the chain 331.

Although the invention has been described in detail with reference to certain preferred embodiments, variations and modifications exist within the spirt and scope of the invention as described and defined in the following claims.

The invention claimed is:

1. A showerhead comprising:

a handle extending along a longitudinal axis;

a water passageway received within the handle;

a sprayface supported by the handle and including a plurality of spray outlets which define a plurality of different sets of the spray outlets including a first set of spray outlets and a different second set of spray outlets;

a directing plate including a substantially flat and planar wall with opposing substantially planar surfaces and a plurality of connecting ports, the connecting ports spaced apart in an arcuate path on the flat planar wall of the directing plate, each of the connecting ports forming an opening extending through the substantially flat and planar wall of the directing plate and providing fluid communication between the water passageway and an associated one of the plurality of different sets of the spray outlets;

a water diverter device including a pivotable waterway including a diverter body having a proximal end and a distal end, the diverter body defining an inlet, an outlet, and a fluid passageway extending within the diverter body between the inlet and the outlet, wherein the outlet is positioned distally of the inlet; and wherein the diverter body of the water diverter device is pivotable relative to the directing plate such that the outlet is movable along the arcuate path on the flat and planar wall of the directing plate, and the outlet is in selective communication with different ones of the connecting ports of the directing plate whereby, when the diverter body is in a first position along the arcuate path, water is discharged solely through the first set of spray outlets and, when the diverter body is in a second position along the arcuate path, water is discharged solely through the second set of spray outlets.

2. The showerhead of claim 1, wherein the diverter body is pivotable about the inlet of the water diverter device.

3. The showerhead of claim 2, wherein the directing plate includes an outlet boss defining an outlet fluidly coupled with the inlet of the water diverter device and wherein the water diverter device is pivotally coupled with the outlet boss.

4. The showerhead of claim 1, further comprising a driving mechanism operably coupled to the water diverter device.

5. The showerhead of claim 4, wherein the driving mechanism includes:

a button slidably supported for axial movement parallel to the longitudinal axis of the handle;

a connecting arm coupling the button to the distal end of the diverter body; and wherein axial movement of the button is translated into pivoting movement of the diverter body.

6. The showerhead of claim 5, wherein the connecting arm includes a first end supported by a first pivot coupling, and a second end opposite the first end and supported by a second pivot coupling.

7. The showerhead of claim 1, wherein a spray force through the spray outlets increases as the outlet of the water diverter device moves along the arcuate path in fluid communication with successive ones of the connecting ports.

8. The showerhead of claim 7, wherein the plurality of different sets of the spray outlets have different cross-sectional flow areas to provide different spray forces.

9. The showerhead of claim 8, wherein the different sets of the spray outlets include a first annular set of spray outlets, a second annular set of spray outlets, and a third annular set of spray outlets.

10. The showerhead of claim 1, wherein the water diverter device further includes a compliant seal supported by the diverter body around the outlet.

11. The showerhead of claim 1, wherein the sprayface defines a center sprayhead axis, the diverter body of the water diverter device is pivotable about a waterway pivot axis, and the waterway pivot axis is offset from the center sprayhead axis.

12. The showerhead of claim 1, wherein the plurality of different sets of the spray outlets includes a third set of spray outlets different from the first and second sets of spray outlets, and wherein, when the diverter body is in a third position along the arcuate path, water is discharged solely through the third set of spray outlets.

13. The showerhead of claim 12, wherein, when the diverter body is in a fourth position along the arcuate path, substantially all water flow is blocked from being discharged through the plurality of spray outlets.

14. The showerhead of claim 13, wherein, when the diverter body is in a fifth position along the arcuate path, the water flow is discharged through both the first and second sets of spray outlets; and wherein, when the diverter body is in a sixth position along the arcuate path, the water flow is discharged through both the second and third sets of spray outlets.

15. A showerhead comprising:

a handle extending along a longitudinal axis;

a water passageway received within the handle;

a sprayface supported by the handle and including a plurality of spray outlets which define a plurality of different sets of the spray outlets;

a directing plate including a plurality of connecting ports, the connecting ports spaced apart in an arcuate path, each of the connecting ports providing fluid communication between the water passageway and an associated one of the plurality of different sets of the spray outlets;

a water diverter device including a pivotable waterway including a diverter body having a proximal end and a distal end, the diverter body defining an inlet, an outlet, and a fluid passageway extending within the diverter body between the inlet and the outlet, wherein the outlet is positioned distally of the inlet; and wherein the diverter body of the water diverter device is pivotable such that the outlet is movable along the arcuate path, and the outlet is in selective communication with different ones of the connecting ports of the directing plate; and wherein the water diverter device further includes a spring and a detent biased by the spring, and the directing plate includes a plurality of retaining recesses associated with the connecting ports, the detent configured to be selectively received within the retaining recesses.

16. The showerhead of claim 15, wherein the water diverter device further includes a compliant seal supported by the diverter body around the outlet.

17. The showerhead of claim 15, wherein the diverter body is pivotable about the inlet of the water diverter device.

18. The showerhead of claim 17, wherein the sprayface defines a center sprayhead axis, the diverter body of the water diverter device is pivotable about a waterway pivot axis, and the waterway pivot axis is offset from the center sprayhead axis.

19. A showerhead comprising:

a handle extending along a longitudinal axis;

a water passageway received within the handle;

a sprayface supported by the handle and including a plurality of spray outlets which define a plurality of different sets of the spray outlets;

a directing plate including a plurality of connecting ports, the connecting ports spaced apart in an arcuate path, each of the connecting ports providing fluid communication between the water passageway and an associated one of the plurality of different sets of the spray outlets;

a water diverter device including a pivotable waterway including a diverter body having a proximal end and a distal end, the diverter body defining an inlet, an outlet, and a fluid passageway extending within the diverter body between the inlet and the outlet, wherein the outlet is positioned distally of the inlet; and wherein the diverter body of the water diverter device is pivotable such that the outlet is movable along the arcuate path, and the outlet is in selective communication with different ones of the connecting ports of the directing plate;

wherein the water diverter device further includes a compliant seal supported by the diverter body around the outlet, wherein the compliant seal includes a resilient gasket including a cup; and wherein a spring is operably coupled to the cup to bias the gasket toward the directing plate.

20. The showerhead of claim 19, wherein the diverter body is pivotable about the inlet of the water diverter device.

21. The showerhead of claim 20, wherein the sprayface defines a center sprayhead axis, the diverter body of the water diverter device is pivotable about a waterway pivot axis, and the waterway pivot axis is offset from the center sprayhead axis.

* * * * *